(12) United States Patent
Aoki et al.

(10) Patent No.: US 11,803,795 B2
(45) Date of Patent: Oct. 31, 2023

(54) WORK ASSIST DEVICE

(71) Applicant: Mitsubishi Electric Corporation, Tokyo (JP)

(72) Inventors: Atsuko Aoki, Tokyo (JP); Ryuhei Sumisaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 152 days.

(21) Appl. No.: 17/440,789

(22) PCT Filed: Apr. 25, 2019

(86) PCT No.: PCT/JP2019/017620
§ 371 (c)(1),
(2) Date: Sep. 20, 2021

(87) PCT Pub. No.: WO2020/217381
PCT Pub. Date: Oct. 29, 2020

(65) Prior Publication Data
US 2022/0164728 A1    May 26, 2022

(51) Int. Cl.
*G06Q 10/0633* (2023.01)
*G06Q 50/04* (2012.01)

(52) U.S. Cl.
CPC ......... *G06Q 10/0633* (2013.01); *G06Q 50/04* (2013.01)

(58) Field of Classification Search
CPC .......................................... G06Q 10/00–50/00
(Continued)

(56) References Cited

U.S. PATENT DOCUMENTS

2003/0065679 A1  4/2003  Hirayama
2004/0267592 A1* 12/2004  Ogushi ............... G06Q 10/105
                                                           705/320
(Continued)

FOREIGN PATENT DOCUMENTS

JP    2003-108219 A    4/2003
JP    2010-20495 A     1/2010
(Continued)

OTHER PUBLICATIONS

International Search Report and Written Opinion dated Jul. 16, 2019, received for PCT Application PCT/JP2019/017620, Filed on Apr. 25, 2019, 10 pages including English Translation.

*Primary Examiner* — Alan S Miller
(74) *Attorney, Agent, or Firm* — XSENSUS LLP

(57) ABSTRACT

A work assist device includes a work burden degree evaluation unit, an improvement measures storage, a simulation unit, and an improvement measures determination unit. The work burden degree evaluation unit evaluates a work burden degree indicating a degree of burden imposed on an operator due to work from operator information and production facility information. The operator information is information related to the operator performing the work in cooperation with a production facility. The improvement measures storage stores improvement measures for improving the work burden degree. The simulation unit performs simulation of estimating an estimated improvement effect indicating a degree of improvement of the work burden degree when the improvement measures are applied. The improvement measures determination unit determines application improvement measures to be applied to at least one of the operator and the production facility from the improvement measures, based on the estimated improvement effect.

18 Claims, 15 Drawing Sheets

(58) Field of Classification Search
USPC .............................................. 705/7.11–7.42
See application file for complete search history.

(56) References Cited

U.S. PATENT DOCUMENTS

| | | | |
|---|---|---|---|
| 2013/0331993 A1* | 12/2013 | Detsch | ................... G05B 15/02 |
| | | | 700/275 |
| 2017/0039088 A1 | 2/2017 | Sumioka et al. | |
| 2019/0012531 A1* | 1/2019 | Radwin | ................... G06T 7/251 |
| 2019/0283247 A1* | 9/2019 | Chang | ................... A61B 5/1121 |
| 2019/0347597 A1* | 11/2019 | Asendorf | ............... H04B 1/385 |
| 2020/0000414 A1* | 1/2020 | McCord | ............. G06Q 10/0635 |
| 2020/0327465 A1* | 10/2020 | Baek | ...................... G16H 50/30 |

FOREIGN PATENT DOCUMENTS

| | | |
|---|---|---|
| JP | 5027053 B2 | 9/2012 |
| JP | 2014-199595 A | 10/2014 |
| JP | 2017-33457 A | 2/2017 |
| JP | 2017-68428 A | 4/2017 |
| JP | 2017-68430 A | 4/2017 |
| JP | 2017-68432 A | 4/2017 |

* cited by examiner

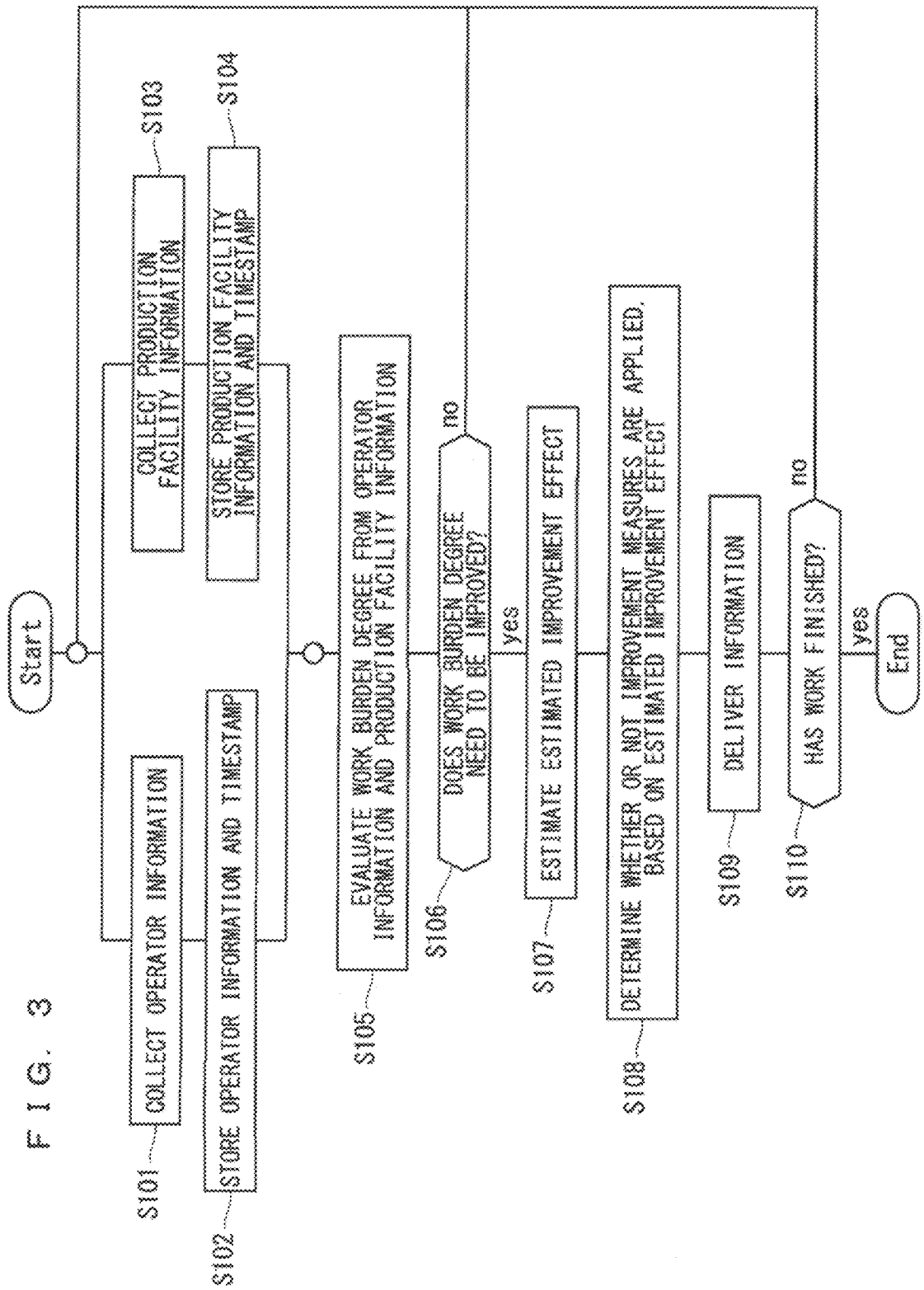

F I G. 4

| DATE AND TIME OF COLLECTION | FIRST DEVICE OPERATION CONDITION | FIRST DEVICE ERROR DETAILS | FIRST DEVICE WORK PRODUCT | FIRST CONVEYOR LINE SET SPEED | FIRST CONVEYOR LINE OPERATION SPEED | WORK TABLE HEIGHT | WORK TABLE ILLUMINANCE | SECOND CONVEYOR LINE SET SPEED | SECOND CONVEYOR LINE OPERATION SPEED |
|---|---|---|---|---|---|---|---|---|---|
| 2019/04/01 10:00:00.000 | ON DUTY | NO ERRORS | 12-6789 | 0.8m/s | 0.8m/s | 1.200m | 500lx | 0.8m/s | 0.0m/s |
| 2019/04/01 10:00:01.000 | ON DUTY | NO ERRORS | 12-6789 | 0.8m/s | 0.0m/s | 1.200m | 500lx | 0.8m/s | 0.0m/s |
| 2019/04/01 10:00:02.000 | ON STANDBY | WORK PENDING AT CONVEYANCE DESTINATION | 12-6789 | 0.8m/s | 0.0m/s | 1.200m | 500lx | 0.8m/s | 0.0m/s |

FIG. 5

| WORK BURDEN DEGREE NAME OF IMPROVEMENT MEASURES | TARGET 1 | TARGET 2 | TARGET 3 | TARGET 1 PART TO BE CHANGED | TARGET 1 CHANGE DETAILS | TARGET 2 PART TO BE CHANGED | TARGET 2 CHANGE DETAILS | ... | WORK BURDEN DEGREE IMPROVEMENT EFFECT EXPECTED VALUE |
|---|---|---|---|---|---|---|---|---|---|
| SPEED CHANGE OF CONVEYOR LINE | FIRST CONVEYOR LINE | SECOND CONVEYOR LINE | | LINE SPEED | -0.2m/s | LINE SPEED | -0.2m/s | ... | 20pt |
| HEIGHT CHANGE OF WORK TABLE | WORK TABLE | OPERATOR | | WORK TABLE HEIGHT | +0.2m | MONITOR | HEIGHT CHANGE WARNING SCREEN DISPLAY | ... | 30pt |
| LIGHTING OF WORK TABLE CHANGE | WORK TABLE | | | WORK TABLE LIGHTING | +100lx | | | ... | 5pt |

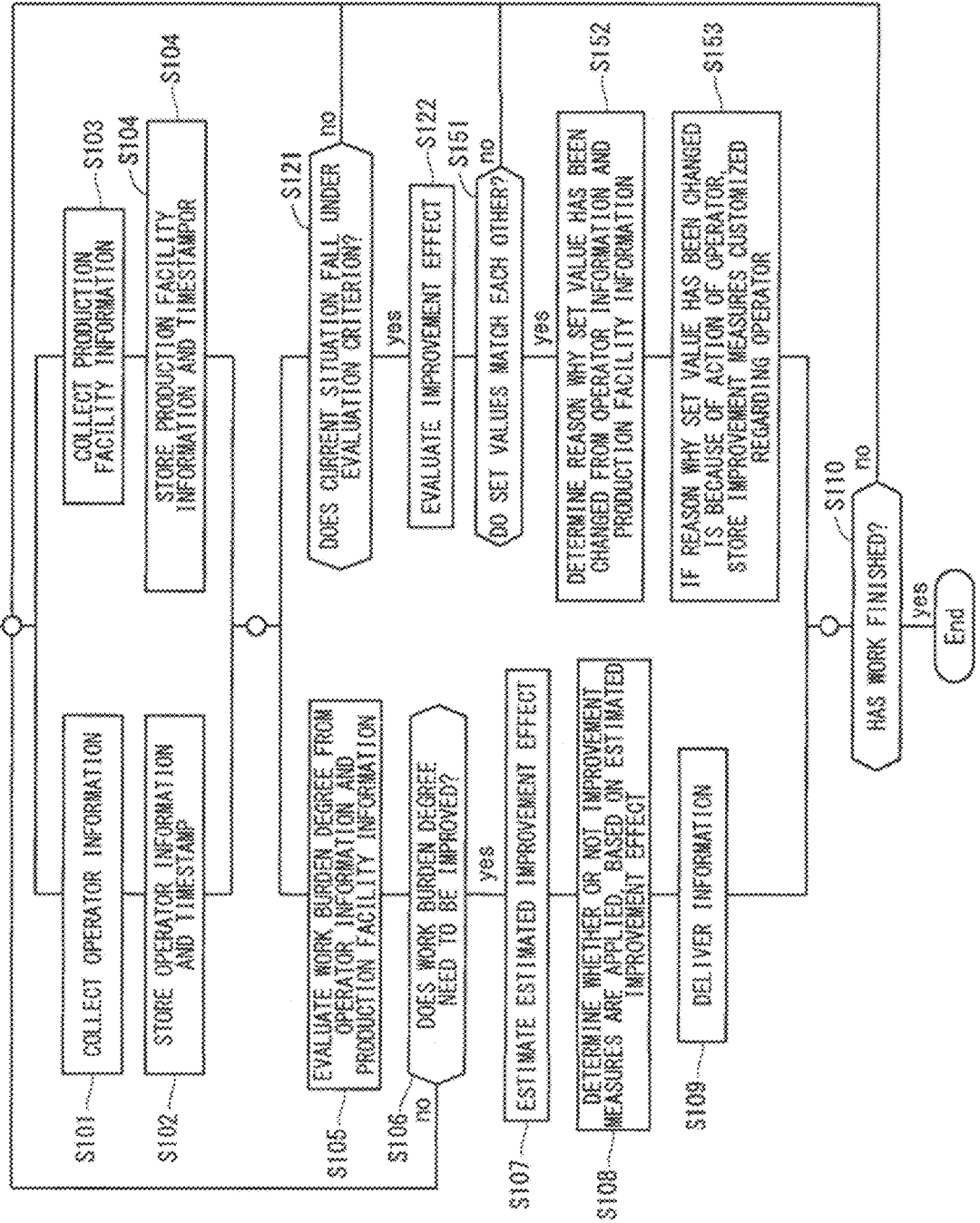

WORK ASSIST DEVICE

CROSS-REFERENCE TO RELATED APPLICATION

The present application is based on PCT filing PCT/JP2019/017620, filed Apr. 25, 2019, the entire contents of which are incorporated herein by reference.

TECHNICAL FIELD

The present invention relates to a work assist device and a work assist system.

BACKGROUND ART

In production lines of factories or the like, reduction in the number of people who wish to become operator, aging, and the like pose a problem. Thus, in the production lines of factories or the like, in order to reduce burden imposed on operators and enhance efficiency of production, a large number of automated technologies, such as industrial robots and process automation systems, have been implemented. However, in the production lines of factories or the like, there are still work processes in which burden imposed on operators cannot be reduced and efficiency of production cannot be enhanced by only those automated technologies. Therefore, in the production lines of factories or the like, in order to reduce burden imposed on operators and maintain or enhance efficiency of production, for example, the following measures are taken: the burden imposed on operators is quantitatively evaluated, and change of operations handled by the operators are prompted based on the evaluated burden.

For example, in the technology described in Patent Document 1, information of physical conditions of an operator is acquired (paragraph 0027). Further, based on the information of the physical conditions of the operator, an evaluation value for work of the operator is calculated (paragraph 0031). Further, arrangement simulation for obtaining a plurality of process arrangements, in which arrangement details are made to be different regarding a group of processes of an arrangement target, is performed (paragraph 0039). This allows for derivation of process arrangements that are efficient in terms of adaptability for work of operators, in consideration of, for example, whether or not an operator is good at or suitable for a process (paragraph 0088).

In the technology described in Patent Document 2, time required for work of each work type of each operator is extracted (paragraph 0066). Further, a variance value α1 is calculated regarding all of stored actual results values for a set of actual results values of the time required for work of each work type of each operator (paragraph 0067). Further, the set of all of the actual results values of the time required for work of each work type of each operator is divided at predetermined sampling intervals, and a variance value α2 of the actual results values is calculated for each divided set (paragraph 0067). Further, if the variance value α2 is larger than the variance value α1, it is determined that there is unevenness in the time required for the work of the operator, and it is thus determined that work efficiency of the operator has reduced (paragraph 0079). Further, according to a degree of reduction of work efficiency, a work plan is adjusted so that work burden on the operator is mitigated (paragraph 0080). With this configuration, depending on various purposes such as work efficiency optimization, a work plan can be made or adjusted by taking conditions or features of operators into consideration (paragraph 0088).

PRIOR ART DOCUMENTS

Patent Documents

Patent Document 1: Japanese Patent Application Laid-Open No. 2017-68432
Patent Document 2: Japanese Patent No. 5027053

SUMMARY

Problem to be Solved by the Invention

When the measures described above are taken, the burden imposed on operators can be reduced and efficiency of production can be maintained or enhanced. However, if there are not a sufficient number of operators who can be involved in the work, the measures described above cannot be taken. Thus, in the production lines of factories or the like, it is expected that a machine-initiated system in which operators perform work in accordance with a production facility shifts to an operator-initiated system in which a production facility assists maximization of performance exerted by operators.

The present invention is made in view of these problems. The problem to be solved by the present invention is to provide a work assist device and a work assist system that can automatically apply improvement measures for effectively reducing burden imposed on an operator due to work.

Means to Solve the Problem

A work assist device includes a work burden degree evaluation unit, an improvement measures storage, a simulation unit, and an improvement measures determination unit.

The work burden degree evaluation unit evaluates a work burden degree indicating a degree of burden imposed on an operator due to work from operator information and production facility information. The operator information is information related to the operator performing the work in cooperation with a production facility. The production facility information is information related to the production facility.

The improvement measures storage stores improvement measures for improving the work burden degree.

The simulation unit performs simulation of estimating an estimated improvement effect indicating a degree of improvement of the work burden degree when the improvement measures are applied.

The improvement measures determination unit determines application improvement measures to be applied to at least one of the operator and the production facility from the improvement measures, based on the estimated improvement effect.

Effects of the Invention

According to the present invention, the work burden degree indicating the degree of burden imposed on the operator due to work can be evaluated from information regarding the operator and the production facility. Further, the estimated improvement effect indicating the degree of improvement of the work burden degree when the improvement measures for improving the evaluated work burden degree are applied is estimated. Further, the application improvement measures to be applied to at least one of the operator and the production facility are determined based on the estimated estimated improvement effect. Thus, the improvement measures for effectively reducing the burden imposed on the operator due to work can be automatically applied.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a flowchart illustrating a procedure of processing performed by the work assist system and the work assist device according to the first embodiment.

FIG. 4 is a diagram illustrating an example of production facility information and timestamps stored in the work assist system and the work assist device according to the first to fifth embodiments.

FIG. 5 is a diagram illustrating an example of improvement measures and estimated improvement effects stored in the work assist system and the work assist device according to the first to fifth embodiments.

FIG. 15 is a flowchart illustrating a procedure of processing performed by the work assist system and the work assist device according to the fifth embodiment.

DESCRIPTION OF EMBODIMENTS

1 Introduction

A work assist system and a work assist device described below assist work that is performed by an operator in cooperation with a production facility in a production line of a factory including the operator and a production facility. The work assist system and the work assist device may assist work that is performed by an operator in cooperation with a production facility in other than a production line of a factory. The assistance in work is performed for improving a work burden degree, which indicates a degree of a burden imposed on the operator due to work. Thus, the production facility includes devices that can be controlled from the work assist system and the work assist device. The devices are a work table whose height and the like are adjustable, a robot device that performs cooperative production with an operator, a processing device that requires supply of a component from the operator, a mechanism that supports and/or lifts a work target object being a target of work, a conveyor line that conveys a work target object, a component, or the like to the operator or from the operator, a lighting facility that lights up around the hands of the operator, an air-conditioning facility that is introduced into the work area in which work is performed, an air-sending facility that is introduced into the work area in which work is performed, and the like.

2 First Embodiment 2.1 Work Assist System

Figure 1:
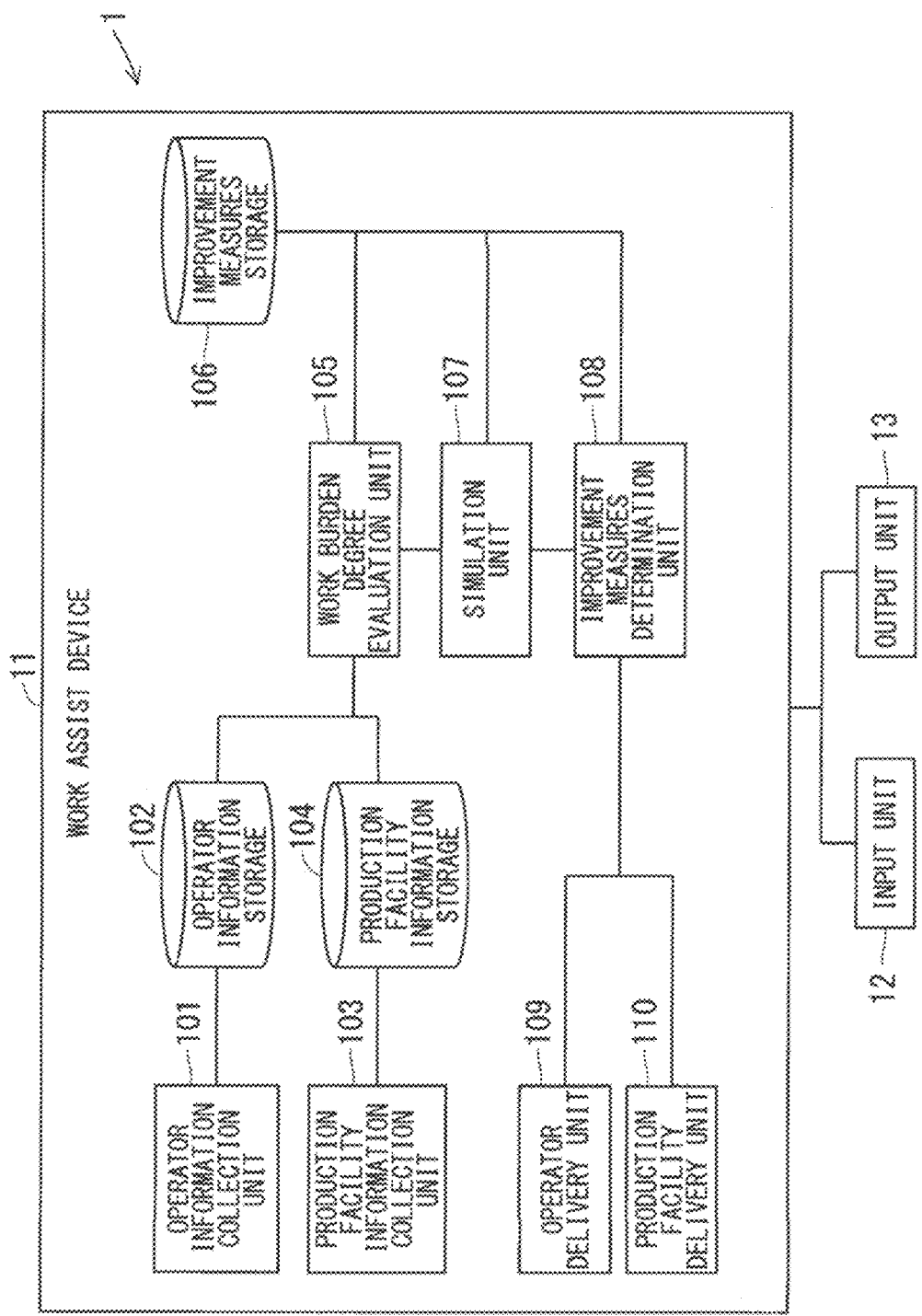
FIG. 1 is a block diagram illustrating a work assist system and a work assist device according to the first embodiment.

FIG. 1 is a block diagram illustrating a work assist system and a work assist device according to the first embodiment.

A work assist system 1 according to the first embodiment illustrated in FIG. 1 includes a work assist device 11, an input unit 12, and an output unit 13.

The work assist device 11 determines application improvement measures for improving the work burden degree, based on operator information and production facility information, and applies the determined application improvement measures to at least one of the operator and the production facility. The operator information is information related to the operator. The production facility information is information related to the production facility. The work burden degree indicates the degree of burden imposed on the operator due to work.

The work assist device 11 may include one device, or may include a plurality of devices in combination.

The input unit 12 and the output unit 13 are connected so as to be capable of communicating with the work assist device 11, and serve as a user interface of the work assist device 11. The input unit 12 performs input of information to the work assist device 11. The output unit 13 performs output of information from the work assist device 11.

2.2 Work Assist Device

The work assist device 11 includes an operator information collection unit 101, an operator information storage 102, a production facility information collection unit 103, a production facility information storage 104, a work burden degree evaluation unit 105, an improvement measures storage 106, a simulation unit 107, an improvement measures determination unit 108, an operator delivery unit 109, and a production facility delivery unit 110.

These elements may be configured by causing a computer to execute a program, or may be configured by hardware that does not execute a program.

2.3 Operator Information Collection Unit

The operator information collection unit 101 collects new operator information.

The collected new operator information at least includes a personal identifier (ID) of an operator, a body burden condition, and whether the operator is on duty/on a break/on standby. The personal identifier of the operator is used to identify the operator. The personal identifier is a number, a name, or the like. The body burden condition is a condition of burden imposed on the body. The body burden condition may be collected by measuring life log data with the use of a biological sensor or the like, or may be collected by measuring the posture assumed while work is performed with the use of a posture sensor, a camera, or the like. The measured life log data is life log data of the blood pressure, the heart rate, the body temperature, the sweat rate, and the like. The measured posture is estimated from measured data output by the posture sensor, an image output by the camera, or the like. The collected new operator information may include information other than these pieces of information. For example, the collected new operator information may include continuous working time of the operator, environment data of the place at which the operator is present, details of the utterances of the operator, and the like. The environment data is room temperature, humidity, illuminance, and the like. The collected operator information may include relative length of actual time required for work with respect to standard time required for the work.

In order to enable the work assist device 11 to deliver information for applying the application improvement measures in real time, desirably, the operator information collection unit 101 collects the new operator information successively in real time, based on which the application improvement measures are determined.

2.4 Operator Information Storage

The operator information storage 102 stores the operator information.

The new operator information collected by the operator information collection unit 101 is incorporated in the operator information stored in the operator information storage 102. The operator information stored in the operator information storage 102 may include operator information other than the operator information collected by the operator information collection unit 101. For example, the operator information stored in the operator information storage 102 may include employment management data. The employment management data is gender, age, physical features, chronic diseases (if any), details of the chronic diseases, restrictions on employment (if any), details of the restrictions on employment, years of experience, the strong and the weak in each type of work, qualifications, working hours, overtime hours being worked, records of vacation days being taken, and the like regarding the operator. The physical features are height, weight, and the like.

2.5 Production Facility Information Collection Unit

The production facility information collection unit 103 collects new production facility information.

The collected new production facility information at least includes a device identifier (ID) of a device and an operation condition, and at least one of a set value and the current value of variable parameters related to cooperative production with the operator. The device identifier of the device is used to identify the device. The device identifier is a number, a device name, or the like. The collected new production facility information may include information other than these pieces of information. For example, the collected new production facility information may include at least one of a set value and the current value of variable parameters not related to cooperative production with the operator, whether there is a defect, warning, or the like, measured data of sensors or the like installed inside or around the production facility, and the like. The measured data is measured data of vibration, electromagnetic waves, a current value, a voltage value, a power value, an electric energy, or the like.

In order to enable the work assist device 11 to deliver information for applying the application improvement measures in real time, desirably, the production facility information collection unit 103 collects the new production facility information successively in real time, based on which the application improvement measures are determined.

2.6 Production Facility Information Storage

The production facility information storage 104 stores the production facility information.

The new production facility information collected by the production facility information collection unit 103 is incorporated in the production facility information stored in the production facility information storage 104. The production facility information stored in the production facility information storage 104 may include production facility information other than the production facility information collected by the production facility information collection unit 103. For example, the production facility information stored in the production facility information storage 104 may include the year and the month of purchase, a model number, a manufacture number, cumulative time of operation, records of daily inspection, records of maintenance, the upper and lower values indicating a range in which the variable parameters related to cooperative production with the operator can be set, the upper and lower values indicating a range in which the variable parameters not related to cooperative production with the operator can be set, operation plans, records of operation, and the like regarding the production facility.

2.7 Work Burden Degree Evaluation Unit

The work burden degree evaluation unit 105 evaluates the work burden degree from the operator information stored in the operator information storage 102 and the production facility information stored in the production facility information storage 104. When the work burden degree is evaluated, for example, the posture of the operator is estimated from measured data output by the posture sensor, an image output by the camera, or the like. Further, the work burden degree is estimated from the estimated posture of the operator by using existing technology such as "DhaibaWorks" being platform software for digital human technology developed by the National Institute of Advanced Industrial Science and Technology of the National Research and Development Agency. The work burden degree may be estimated from the measured data acquired by the biological sensor or the like. The work burden degree may be estimated from relative length of actual time required for work with respect to standard time required for the work.

In order to enable the work assist device 11 to deliver information for applying the application improvement measures in real time, desirably, the work burden degree evaluation unit 105 evaluates the work burden degree in real time from the new operator information and the new production facility information when the new operator information and the new production facility information are collected.

2.8 Improvement Measures Storage

The improvement measures storage 106 stores improvement measures for improving the work burden degree.

The improvement measures stored in the improvement measures storage 106 are a plurality of sets of improvement measures.

The improvement measures stored in the improvement measures storage 106 at least include a device identifier (ID) of the device, and information for applying the improvement measures delivered to the device. The device identifier is used to identify the device. The device identifier is a number, a device name, or the like. The improvement measures stored in the improvement measures storage 106 may include information other than these pieces of information. For example, the improvement measures stored in the improvement measures storage 106 may include information delivered to a device other than the device to which the improvement measures are applied or an operator before and after the improvement measures are applied, an expected value, a minimum value, or a maximum value of an improvement amount of the work burden degree, and the like.

Desirably, the improvement measures stored in the improvement measures storage 106 include improvement measures whose target is an operator, improvement measures whose target is a production facility, and improvement measures whose target is an operator and a production facility. The improvement measures whose target is an operator are change of working speed, rearrangement of work procedures, and the like. The improvement measures whose target is a production facility are change of the height of the work table, lifting of a heavy object with the use of a production facility, and the like. The improvement measures whose target is an operator and a production facility are increase and decrease of an assistance amount for the operator with the use of a production robot, and the like.

2.9 Simulation Unit

The simulation unit 107 performs simulation of estimating an estimated improvement effect indicating a degree of improvement of the work burden degree when the improvement measures stored in the improvement measures storage 106 are applied. The simulation unit 107 may perform simulation of estimating the estimated improvement effect in advance, and cause the improvement measures storage 106 to store the estimated estimated improvement effect in advance. With the use of existing technology such as "DhaibaWorks" described above, a change of the work burden degree due to a change of the posture before and after the improvement measures stored in the improvement measures storage 106 are applied may be simulated, and the estimated improvement effect may be estimated from the simulated change of the work burden degree. A change of time required for work before and after the improvement measures stored in the improvement measures storage 106 are applied may be simulated, and the estimated improvement effect may be estimated from the simulated change of the time required for the work.

The estimated improvement effect estimated by the simulation unit 107 is the estimated improvement effect of a case in which one set of improvement measures or a plurality of sets of improvement measures selected from the plurality of sets of improvement measures stored in the improvement measures storage 106 are applied.

2.10 Improvement Measures Determination Unit

The improvement measures determination unit 108 determines the application improvement measures to be applied to at least one of the operator and the production facility from the improvement measures stored in the improvement measures storage 106, based on the estimated improvement effect estimated by the simulation unit 107.

The application improvement measures determined by the improvement measures determination unit 108 are one set of application improvement measures or a plurality of sets of application improvement measures.

The application improvement measures determined by the improvement measures determination unit 108 may be improvement measures having the highest estimated improvement effect, or may be a combination of the improvement measures having the highest estimated improvement effect in the improvement measures whose target is the production facility and the improvement measures having the highest estimated improvement effect in the improvement measures whose target is the operator, and improvement measures selected from the improvement measures having the highest estimated improvement effect in the improvement measures whose target is the operator and the production facility. If none of the improvement measures stored in the improvement measures storage 106 can improve the work burden degree, the improvement measures determination unit 108 may determine not to apply the improvement measures.

2.11 Operator Delivery Unit

The operator delivery unit 109 delivers, to the operator, information presented to the operator when the application improvement measures to be applied to the production facility are applied to the production facility. The presented information is information that is desirably presented in order to secure safety of the operator, enhance efficiency of work, and the like.

The application improvement measures determined by the improvement measures determination unit 108 can include one set of application improvement measures or a plurality of sets of application improvement measures to be applied to the operator. When the application improvement measures determined by the improvement measures determination unit 108 include the application improvement measures to be applied to the operator, the operator delivery unit 109 delivers, to the operator, information for applying, to the operator, the application improvement measures to be applied to the operator.

The information delivered by the operator delivery unit 109 is displayed on a monitor for the operator use in work, a mobile terminal owned by the operator, or the like. The information delivered by the operator delivery unit 109 may be simultaneously displayed on digital signage or the like in the factory. The information delivered by the operator delivery unit 109 may be delivered as voice information, various pieces of signal information, or the like.

In order to enable the work assist device 11 to deliver information for applying the application improvement measures in real time, desirably, the operator delivery unit 109 delivers, to the operator, information presented to the operator in real time when the application improvement measures to be applied to the production facility are determined. Further, desirably, the operator delivery unit 109 delivers, to the operator, information for applying, to the operator, the application improvement measures to be applied to the operator in real time when the application improvement measures to be applied to the operator are determined.

2.12 Production Facility Delivery Unit

The application improvement measures determined by the improvement measures determination unit 108 can include one set of application improvement measures or a plurality of sets of application improvement measures to be applied to the production facility. When the application improvement measures determined by the improvement measures determination unit 108 include the application improvement measures to be applied to the production facility, the production facility delivery unit 110 delivers, to the production facility, information for applying, to the production facility, the application improvement measures to be applied to the production facility. The delivered information is a settings change command, a file in which the settings change command is described, a set value, details of change of the set value, and the like.

When the information is delivered to the production facility by the production facility delivery unit 110, for example, the settings change command is directly issued to the production facility via a network or the like. The production facility may be connected to a programmable logic controller, a database, or the like via a network or the like, a set value may be written in the programmable logic controller, the database, or the like, and the production facility may update its own set value by referring to the written set value. A file in which the settings change command is described may be output to a network folder or the like that can be accessed by both of the production facility and the production facility delivery unit 110, and the production facility may update its own set value by reading the file.

In order to enable the work assist device 11 to deliver information for applying the application improvement measures in real time, desirably, the production facility delivery unit 110 delivers, to the production facility, information for applying, to the production facility, the application improvement measures to be applied to the production facility in real time when the application improvement measures to be applied to the production facility are determined.

2.13 Handling Improvement Measures with Introduction of New Facility

The improvement measures stored in the improvement measures storage 106 desirably include improvement measures with introduction of a new facility and improvement measures without introduction of a new facility.

In this case, in the simulation performed by the simulation unit 107, the estimated improvement effect indicating the degree of improvement of the work burden degree when the improvement measures with introduction of a new facility are applied and the estimated improvement effect indicating the degree of improvement of the work burden degree when the improvement measures without introduction of a new facility are applied are estimated. The estimation of the estimated improvement effects is performed regarding one operator, or regarding a plurality of operators.

Further, when the improvement measures with introduction of a new facility have the best estimated improvement effect, the improvement measures determination unit 108 incorporate, in the application improvement measures, the improvement measures with introduction of a new facility that have the best estimated improvement effect but cannot be executed in real time and the improvement measures without introduction of a new facility that do not have the best estimated improvement effect but can be executed in real time. The improvement measures without introduction of a new facility incorporated in the application improvement measures are one set of improvement measures or a plurality of sets of improvement measures.

2.14 Example of Production Line

Figure 2:
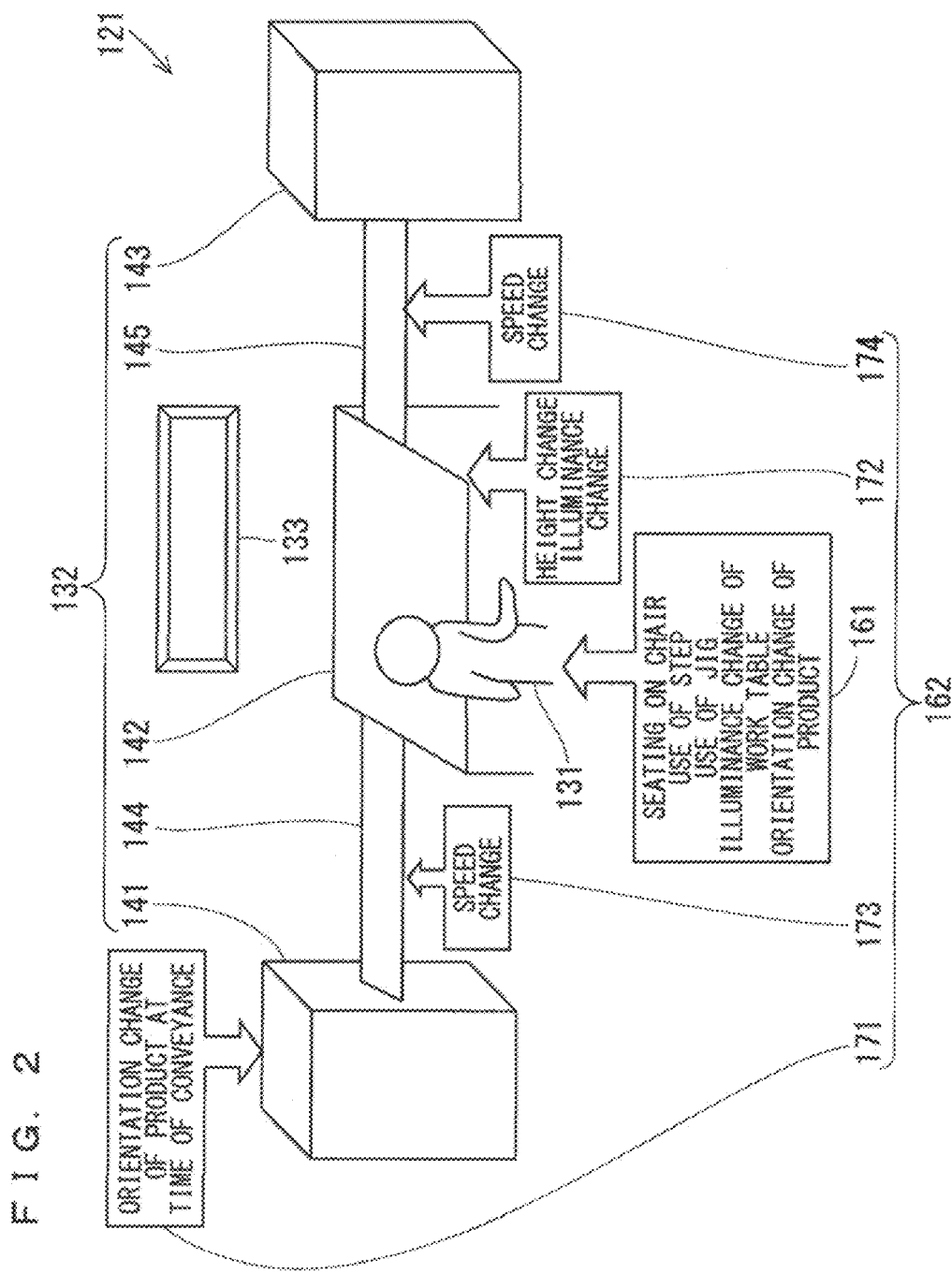
FIG. 2 is a schematic diagram schematically illustrating an example of a production line in which work assisted by a work assist system and a work assist device is performed according to the first to fifth embodiments.

FIG. 2 is a schematic diagram schematically illustrating an example of a production line in which work assisted by a work assist system and a work assist device is performed according to the first embodiment. FIG. 2 also illustrates examples of the improvement measures stored in the work assist system and the work assist device according to the first embodiment.

In the example illustrated in FIG. 2, a production line 121 includes one operator 131 and one production facility 132. The production facility 132 includes a first device 141, a work table 142, a second device 143, a first conveyor line 144, and a second conveyor line 145.

The first conveyor line 144 conveys products form the first device 141 to the work table 142. The second conveyor line 145 conveys products from the work table 142 to the second device 143.

A biological sensor and a posture sensor are attached to the operator 131. The biological sensor measures the heart rate, the body temperature, and the like. The posture sensor measures the posture.

The operator 131 performs work of assembling products on the work table 142. The height of the work table 142 is adjustable. The height of the work table 142 can also be changed directly by the work assist device 11, or can be changed by the operator 131 performing operation on a button or the like.

The production line 121 includes a monitor for an operator 133. The monitor for an operator 133 is installed in front of the operator 131. On the monitor for an operator 133, in normal cases, information related to plans of work is displayed. The production line 121 produces three types of products having dimensions different from each other. The three types of products are the same products, but have greatly different dimensions. Thus, when the operator 131 performs work of assembling a product having the largest dimensions, the operator 131 needs to perform the work while stretching their arms upward. In contrast, when the operator 131 performs work of assembling a product having the smallest dimensions, the operator 131 needs to perform the work while bending forward.

In the example illustrated in FIG. 2, the improvement measures stored in the improvement measures storage 106 include improvement measures 161 whose target is the operator 131 and improvement measures 162 whose target is the production facility 132. The improvement measures 161 whose target is the operator 131 include "seating on a chair", "use of a step", "use of a jig", "illuminance change of the work table", and "orientation change of the product". The improvement measures 162 whose target is the production facility 132 include improvement measures 171 whose target is the first device 141, improvement measures 172 whose target is the work table 142, improvement measures 173 whose target is the first conveyor line 144, and improvement measures 174 whose target is the second conveyor line 145. The improvement measures 171 whose target is the first device 141 include "orientation change of the product at the time of conveyance". The improvement measures 172 whose target is the work table 142 include "height change" and "illuminance change". The improvement measures 173 whose target is the first conveyor line 144 and the improvement measures 174 whose target is the second conveyor line 145 each include "speed change". The improvement measures stored in the improvement measures storage 106 include improvement measures whose target is the operator 131 and the production facility 132 (not shown). The improvement measures whose target is the operator 131 and the production facility 132 include "addition of a new operator, a new conveyor line, and a new work table".

The following will describe processing performed by the work assist system 1 and the work assist device 11 when the work assist system 1 and the work assist device 11 assist the work performed in the production line 121 illustrated in FIG. 2. However, the work assist system 1 and the work assist device 11 can also assist work performed in a production line other than the production line 121 illustrated in FIG. 2.

2.15 Processing Performed by Work Assist System and Work Assist Device

FIG. 3 is a flowchart illustrating a procedure of processing performed by the work assist system and the work assist device according to the first embodiment.

When the work assist system 1 and the work assist device 11 assist work, Steps S101 to S110 illustrated in FIG. 3 are executed. When Steps S101 to S104 are executed, Steps S103 and S104 are executed in parallel to Steps S101 and S102.

In Step S101, the operator information collection unit 101 collects operator information from the biological sensor and the posture sensor attached to the operator 131. The collected operator information is measured data output by the biological sensor and the posture sensor.

In subsequent Step S102, the collected operator information and timestamps associated with the collected operator information are stored in the operator information storage 102.

In Step S103, the production facility information collection unit 103 collects production facility information from the first device 141, the work table 142, the first conveyor line 144, and the second conveyor line 145.

In subsequent Step S104, the collected production facility information and timestamps associated with the collected production facility information are stored in the production facility information storage 104.

FIG. 4 is a diagram illustrating an example of production facility information and timestamps stored in the work assist system and the work assist device according to the first embodiment.

In the example illustrated in FIG. 4, production facility information 181 is associated with a timestamp 182. The production facility information 181 includes "operation condition", "error details", and "work product" collected from the first device 141. Further, the production facility information 181 includes "set speed" and "operation speed" collected from the first conveyor line 144. Further, the production facility information 181 includes "height" and "illuminance" collected from the work table 142. Further, the production facility information 181 includes "set speed" and "operation speed" collected from the second conveyor line 145.

Further description is given referring back to FIG. 3.

In Step S105 subsequent to Steps S102 and S104, the work burden degree evaluation unit 105 extracts the operator information stored in the operator information storage 102, and extracts the production facility information stored in the production facility information storage 104. Further, the work burden degree evaluation unit 105 evaluates the work burden degree from the extracted operator information and production facility information. The extracted operator information and production facility information are operator information and production facility information whose timestamps at the most recent same time are associated. Alternatively, the extracted operator information and production facility information are operator information and production facility information whose timestamps at times most close to each other within a set tolerance range are associated. The set tolerance range is a difference between time intervals at which the operator information is collected and time intervals at which the production facility information is collected, and the like. From these, the work burden degree is evaluated from the operator information and the production facility information that are collected substantially at the same times.

In subsequent Step S106, whether or not the work burden degree needs to be improved is determined. A case in which it is determined that the work burden degree needs to be improved is a case in which the work burden degree at the current time exceeds a set threshold, a case in which a difference between the work burden degree at the current time and the work burden degree at time several seconds earlier than the current time exceeds a set threshold, a case in which the work burden degree has a tendency of increase for previous several seconds, or the like. If it is determined that the work burden degree needs to be improved, Steps S107 to S110 are sequentially executed. If it is determined that the work burden degree need not be improved, Steps S101 and S103 are executed again.

In Step S107, the simulation unit 107 performs simulation of estimating the estimated improvement effect indicating the degree of improvement of the work burden degree when the improvement measures stored in the improvement measures storage 106 are applied. Further, the simulation unit 107 causes the improvement measures determination unit 108 to store the improvement measures and the estimated improvement effect.

FIG. 5 is a diagram illustrating an example of improvement measures and estimated improvement effects stored in the work assist system and the work assist device according to the first embodiment.

In the example illustrated in FIG. 5, improvement measures 191 are associated with an estimated improvement effect 192. The improvement measures 191 include "target 1", "target 2", and "target 3" to which the improvement measures 191 are applied. Further, the improvement measures 191 include "part to be changed" and "change details" regarding each of "target 1", "target 2", and "target 3". The estimated improvement effect 192 include "expected value" of the improvement effect of the work burden degree.

The simulation unit 107 estimates the estimated improvement effect indicating the degree of improvement of the work burden degree when the improvement measures are applied, based on the work burden degree evaluated by the work burden degree evaluation unit 105 and the cause of the burden imposed on the operator 131 due to work. For example, the following case is considered: the operator 131 performs work of assembling a product having the smallest dimensions, and the work burden degree indicating the degree of burden imposed on the lower back of the operator 131 due to the work is high. In this case, change of the posture of the operator 131 when the improvement measures are applied is estimated, the work burden degree is re-calculated based on the estimated change of the posture of the operator 131, and the estimated improvement effect indicating the degree of improvement of the work burden degree when the improvement measures are applied is evaluated based on the re-calculated work burden degree. The improvement measures may be tested in advance regarding the operator 131, and the results of the testing of the improvement measures regarding the operator 131, specifically, the improvement effect indicating the degree of improvement of the work burden degree when the improvement measures are actually applied, may be stored, and the stored improvement effect may be extracted and regarded as the estimated improvement effect. When there are a plurality of sets of improvement measures having the estimated improvement effect, evaluation results regarding a secondary evaluation criterion may be calculated. The secondary evaluation criterion is whether or not the improvement measures have the highest estimated improvement effect, whether or not burden is imposed on other parts when the improvement measures are applied, whether or not a delay is caused in work, or the like.

In subsequent Step S108, the improvement measures determination unit 108 determines whether or not the improvement measures stored in the improvement measures storage 106 are to be applied, based on the estimated improvement effect stored in the improvement measures storage 106. Further, the improvement measures determination unit 108 causes the improvement measures storage 106 to store information indicating whether or not the improvement measures are applied. The information is information indicating whether or not the improvement measures are application improvement measures. Desirably, the timestamp associated with the collected operator information, the timestamp associated with the collected production facility information, the estimated improvement effect, and the information indicating whether or not the improvement measures are applied are stored by being associated with each other.

The improvement measures determination unit 108 may determine whether or not the improvement measures are applied, based on the evaluation results regarding the secondary evaluation criterion calculated by the simulation unit 107, in addition to the estimated improvement effect.

The determination as to whether or not the improvement measures are applied is performed so that the improvement measures 162 whose target is the production facility 132 are preferentially applied.

If none of the improvement measures stored in the improvement measures storage 106 can improve the current work burden degree, the improvement measures determination unit 108 may determine not to apply the improvement measures.

Further, when the improvement measures with introduction of a new facility have the best estimated improvement effect, the improvement measures determination unit 108 incorporate, in the application improvement measures, the improvement measures with introduction of a new facility that have the best estimated improvement effect but cannot be executed in real time and the improvement measures without introduction of a new facility that do not have the best estimated improvement effect but can be executed in real time.

In subsequent Step S109, when there are application improvement measures, at least one of the operator delivery unit 109 and the production facility delivery unit 110 delivers information for applying the application improvement measures to at least one of the operator 131 and the production facility 132. For example, when there are application improvement measures to be applied to the operator 131, the operator delivery unit 109 delivers, to the operator 131, a notification for applying, to the operator 131, the application improvement measures to be applied to the operator 131 or the like. Further, when there are application improvement measures to be applied to the production facility 132, the production facility delivery unit 110 delivers, to the production facility 132, a set value for applying, to the production facility 132, the application improvement measures to be applied to the production facility 132 or the like. Further, when the application improvement measures to be applied to the production facility 132 are applied to the production facility 132, as necessary, the operator delivery unit 109 delivers, to the operator 131, information presented to the operator 131 along with the application.

For example, when there are application improvement measures of "height change of the work table", the production facility delivery unit 110 delivers, to the production facility 132, a set value for applying the application improvement measures of "height change of the work table" to the production facility 132. Further, the operator delivery unit 109 delivers, to the operator 131, information indicating that the application improvement measures of "height change of the work table" are applied and the height of the work table 142 is thus automatically changed, in order to secure safety of the operator 131. The delivery of the information is performed via a speaker, the monitor for an operator 133, or the like. The production facility delivery unit 110 may notify a control device included in the first conveyor line 144 and the second conveyor line 145 connected to the work table 142 that the height of the work table 142 is to be changed, and may order the control device to adjust timing of conveyance after work of the operator 131 completes.

In subsequent Step S110, whether or not the work has finished is determined. If the work has finished, processing ends. If the work has not finished, and there are no application improvement measures or the information for applying the application improvement measures has already been delivered, Steps S101 and S103 are executed again.

2.16 Effect of Invention of First Embodiment

According to the invention of the first embodiment, the work burden degree indicating the degree of burden imposed on the operator 131 due to work is evaluated from information regarding the operator 131 and the production facility 132. Further, the estimated improvement effect indicating the degree of improvement of the work burden degree when the improvement measures for improving the evaluated work burden degree are applied is estimated. Further, the application improvement measures to be applied to at least one of the operator 131 and the production facility 132 are determined based on the estimated improvement effect. Thus, the application improvement measures for effectively reducing the burden imposed on the operator 131 due to work can be automatically applied. Accordingly, the operator 131 can perform work with no excessive burden being imposed, regardless of their proficiency and personal features such as physical abilities.

Further, according to the invention of the first embodiment, when the improvement measures with introduction of a new facility have the best estimated improvement effect, the improvement measures with introduction of a new facility that have the best estimated improvement effect but cannot be executed in real time and the improvement measures without introduction of a new facility that do not have the best estimated improvement effect but can be executed in real time are incorporated in the application improvement measures. With this configuration, a long-term improvement method of productivity of the production line can be proposed.

3 Second Embodiment

FIG. 2 is also a schematic diagram schematically illustrating an example of a production line in which work assisted by a work assist system and a work assist device is performed according to the second embodiment. FIG. 4 is also a diagram illustrating an example of production facility information and timestamps stored in the work assist system and the work assist device according to the second embodiment. FIG. 5 is also a diagram illustrating an example of improvement measures and estimated improvement effects stored in the work assist system and the work assist device according to the second embodiment.

Figure 6:
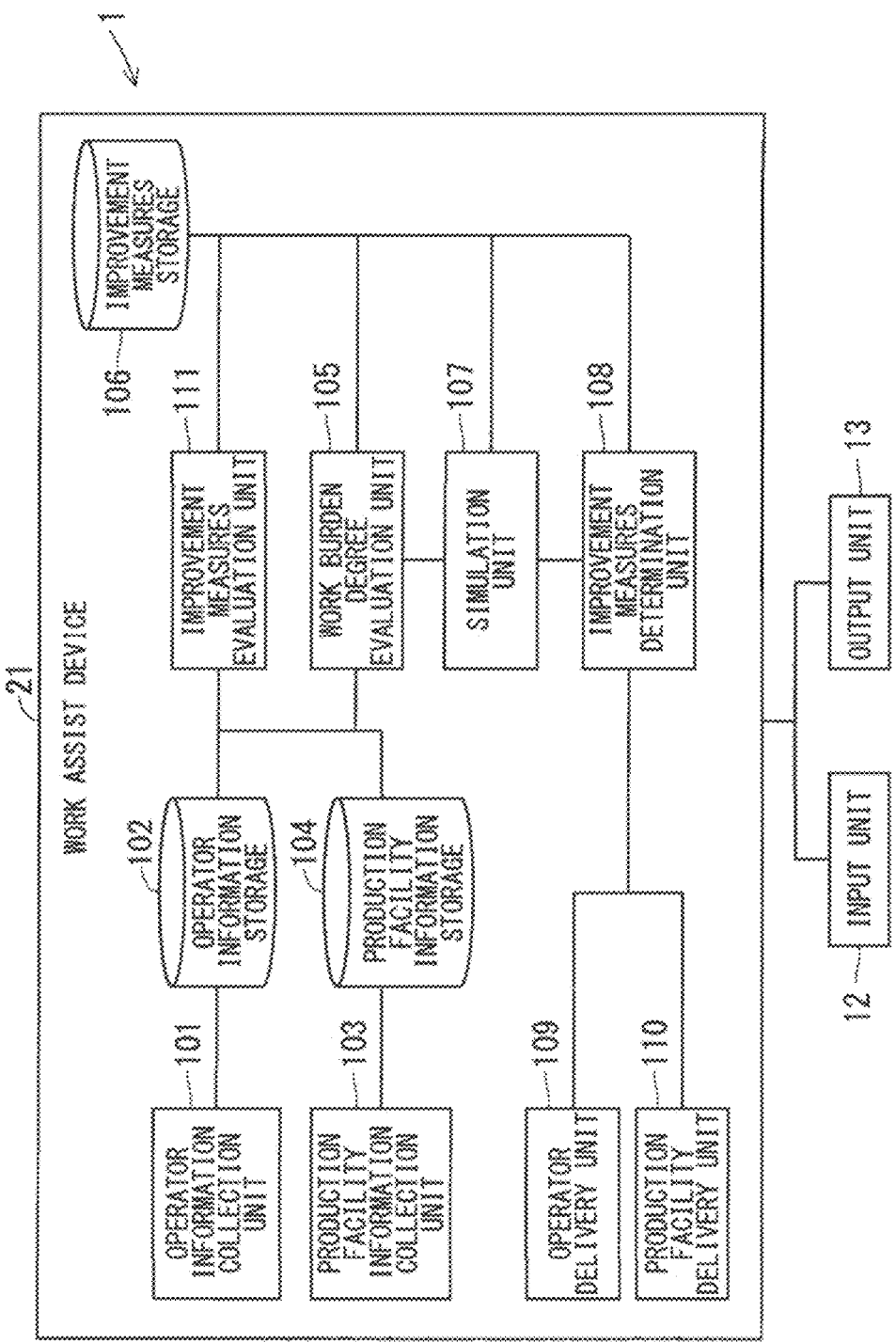
FIG. 6 is a block diagram illustrating a work assist system and a work assist device according to the second embodiment.
Figure 7:
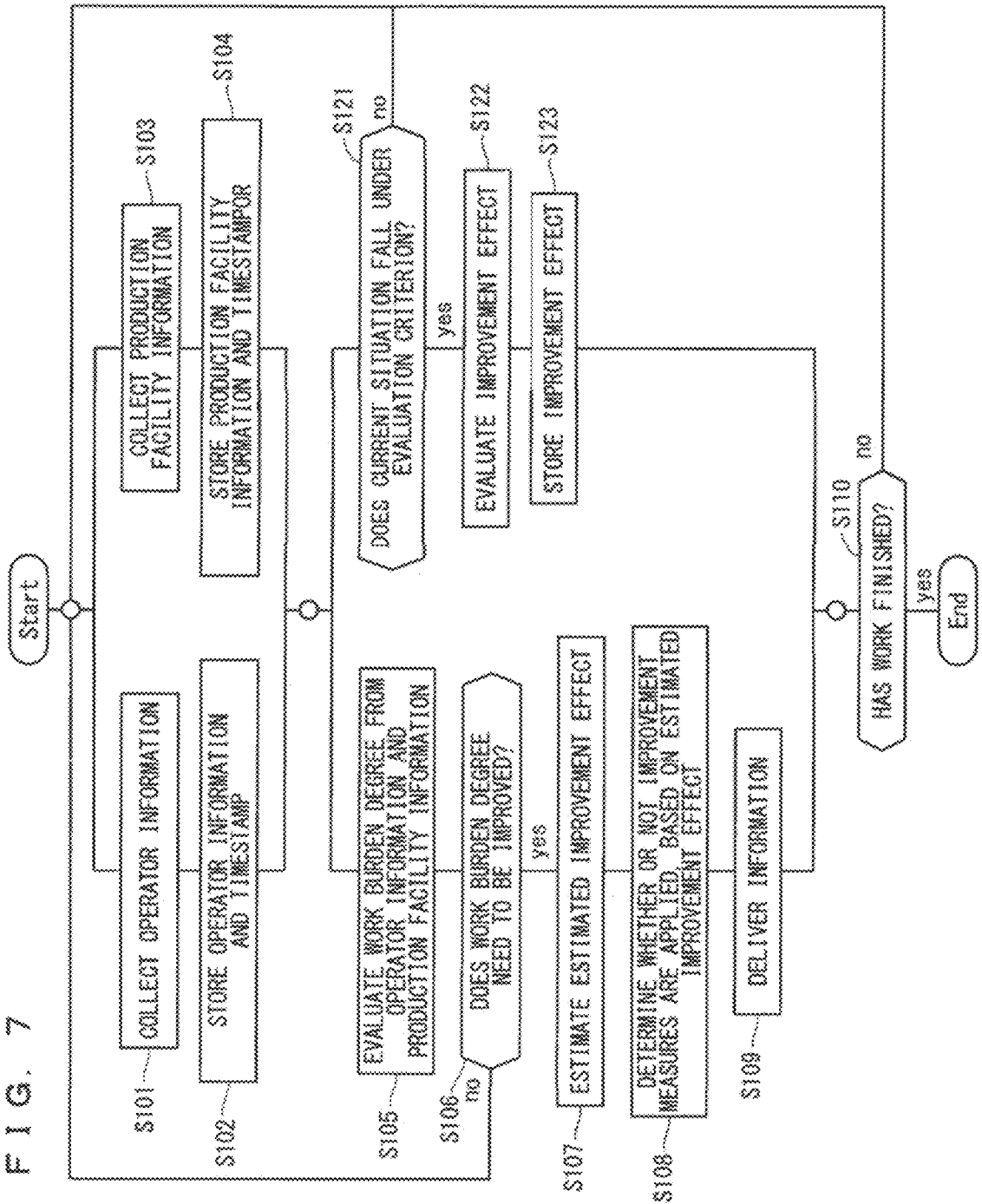
FIG. 7 is a flowchart illustrating a procedure of processing performed by the work assist system and the work assist device according to the second embodiment.

FIG. 6 is a block diagram illustrating a work assist system and a work assist device according to the second embodiment. FIG. 7 is a flowchart illustrating a procedure of processing performed by the work assist system and the work assist device according to the second embodiment.

A work assist system 2 and a work assist device 21 according to the second embodiment illustrated in FIG. 6 are different from the work assist system 1 and the work assist device 11 according to the first embodiment illustrated in FIG. 1 mainly in the following configurations described below. Regarding configurations not described below, configurations similar to the configurations adopted in the work assist system 1 and the work assist device 11 according to the first embodiment are also adopted in the work assist system 2 and the work assist device 21 according to the second embodiment.

As illustrated in FIG. 6, the work assist device 21 includes an improvement measures evaluation unit 111.

The improvement measures evaluation unit 111 is connected to the operator information storage 102, the production facility information storage 104, and the improvement measures storage 106.

The improvement measures evaluation unit 111 evaluates the improvement effect indicating the degree of improvement of the work burden degree when the application improvement measures are actually applied, based on the operator information stored in the operator information storage 102 and the production facility information stored in the production facility information storage 104. Further, the improvement measures evaluation unit 111 causes the improvement measures storage 106 to store the evaluated improvement effect. Differences between the improvement effect and the estimated improvement effect estimated through simulation may be evaluated. The operator 131 may be caused to input evaluation information indicating the improvement effect from the input unit 12. When the operator 131 is caused to input the evaluation information from the input unit 12, desirably, a touch panel, a switch, or the like for receiving the input of the evaluation information is provided on the input unit 12.

When the work assist system 2 and the work assist device 21 assist work, similarly to when the work assist system 1 and the work assist device 11 assist work, Steps S101 to S110 illustrated in FIG. 7 are executed. In addition, when the work assist system 2 and the work assist device 21 assist work, Steps S121 to S123 are executed in parallel to Steps S105 to S109 after Steps S102 and S104 are executed.

In Step S121, the improvement measures evaluation unit 111 determines whether or not the current situation falls under an evaluation criterion. The evaluation criterion indicates that the improvement effect ought to be evaluated. For example, if the information for applying the application improvement measures is delivered within the most recent set time, and work whose work burden degree is supposed to be improved with the application improvement measures continues, it is determined that the current situation falls under the evaluation criterion. If it is determined that the current situation falls under the evaluation criterion, Steps S122 and S123 are sequentially executed, and then Step S110 is executed. If it is determined that the current situation does not fall under the evaluation criterion, Steps S101 and S103 are executed again without Steps S122 and S123 being executed.

In Step S122, the improvement measures evaluation unit 111 evaluates the improvement effect indicating the degree of improvement of the work burden degree when the application improvement measures are actually applied. For example, when the height of the work table 142 is automatically adjusted in order to improve the work burden degree indicating the degree of burden imposed on the lower back of the operator 131, the posture of the operator 131 is measured again using the posture sensor, and whether or not the work burden degree has been improved as indicated by the estimated improvement effect is evaluated based on the measured posture of the operator 131. The evaluation may be performed based on efficiency of work of the operator 131. Life log data such as the blood pressure, the heart rate, the body temperature, and the sweat rate of the operator 131 may be measured using the biological sensor, and evaluation may be performed based on stability of the measured life log data.

In subsequent Step S123, the improvement measures evaluation unit 111 causes the improvement measures storage 106 to store the evaluated improvement effect. Desirably, the collected operator information, the collected production facility information, and the evaluated improvement effect are stored by being associated with each other.

3.1 Effect of Invention of Second Embodiment

According to the invention of the second embodiment, similarly to the invention of the first embodiment, the application improvement measures for effectively reducing the burden imposed on the operator due to work can be automatically applied.

In addition, according to the invention of the second embodiment, ex-post evaluation of the improvement effect indicating the degree of improvement of the work burden degree when the application improvement measures are actually applied is performed. Further, results of the ex-post evaluation are stored in the improvement measures storage 106. With this configuration, the improvement effect of the improvement measures stored in the improvement measures storage 106 can be self-learned, with the result that the improvement measures can be made more appropriate for the operator. Accordingly, the application improvement measures can be made more appropriate for the operator.

When the improvement measures stored in the improvement measures storage 106 are improvement measures that assume improvement of the work burden degree by improving the posture of the operator and the weight burden imposed on the operator, if the application improvement measures, physical change information of the operator, an improvement situation, and the like are stored by being associated with each other, physical features and preference for the work environment of each individual operator can be taken into consideration at the time when the estimated improvement effect is estimated.

4 Third Embodiment

FIG. 2 is also a schematic diagram schematically illustrating an example of a production line in which work assisted by a work assist system and a work assist device is performed according to the third embodiment. FIG. 4 is also a diagram illustrating an example of production facility information and timestamps stored in the work assist system and the work assist device according to the third embodiment. FIG. 5 is also a diagram illustrating an example of improvement measures and estimated improvement effects stored in the work assist system and the work assist device according to the third embodiment.

Figure 8:
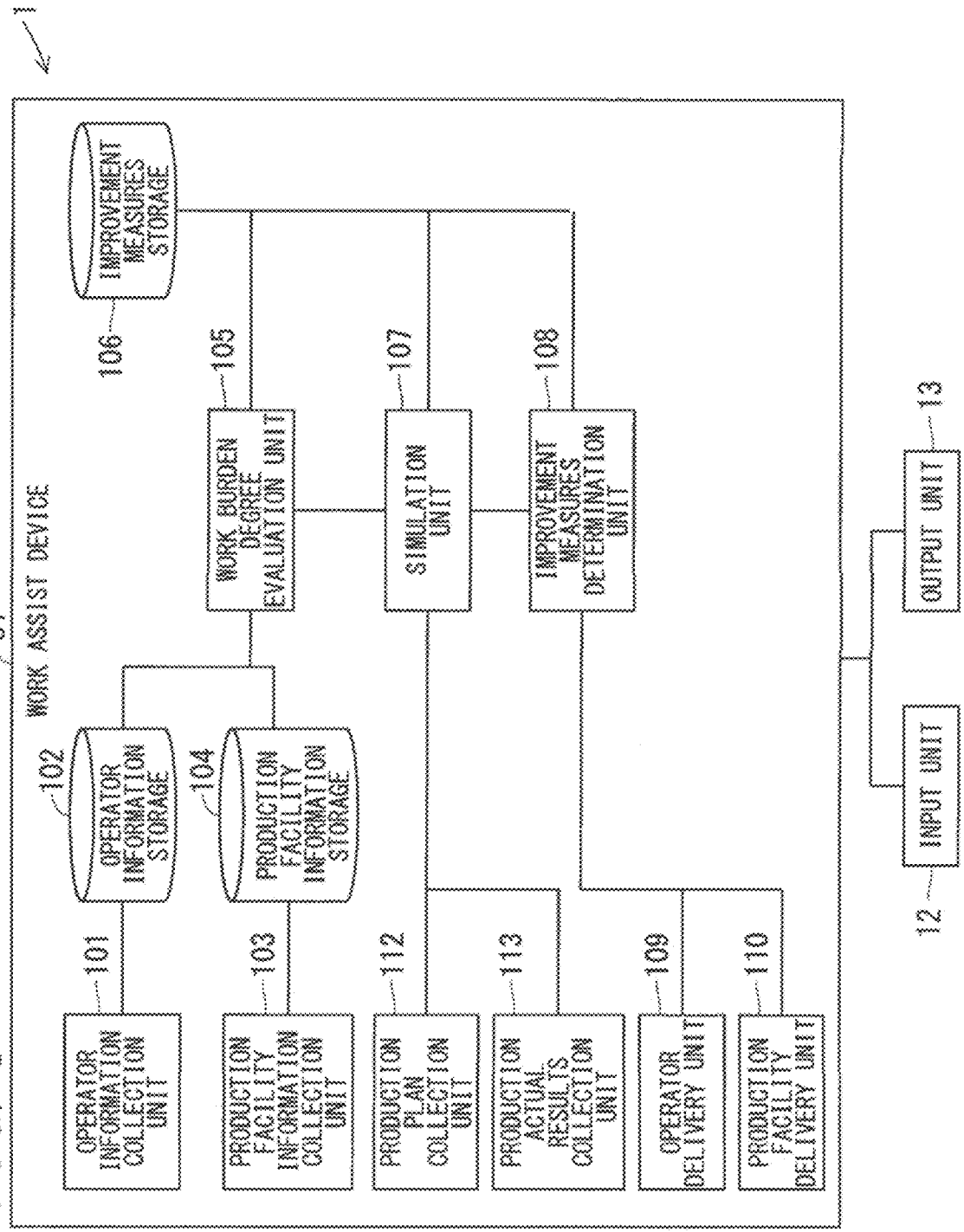
FIG. 8 is a block diagram illustrating a work assist system and a work assist device according to the third embodiment.
Figure 9:
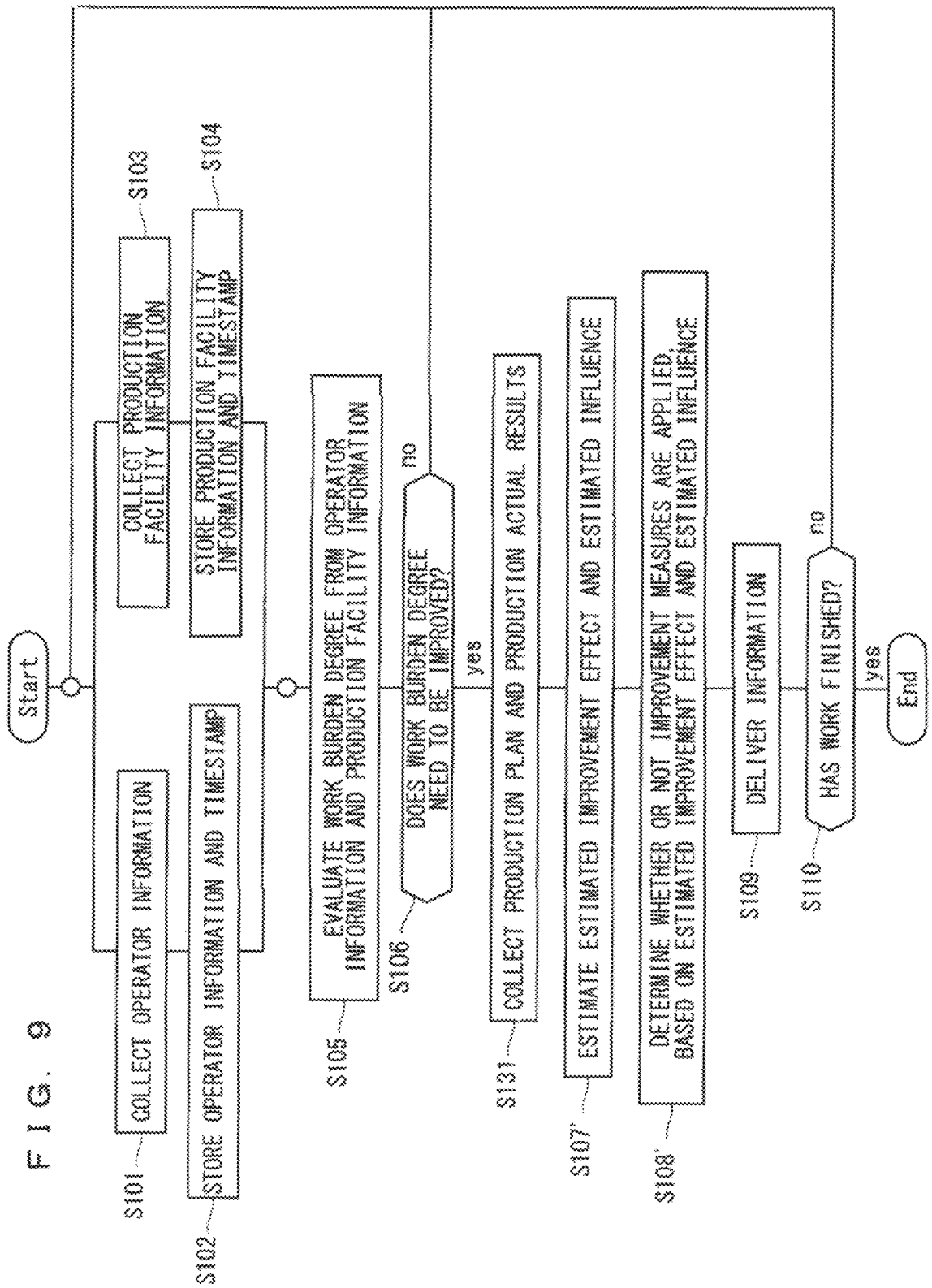
FIG. 9 is a flowchart illustrating a procedure of processing performed by the work assist system and the work assist device according to the third embodiment.

FIG. 8 is a block diagram illustrating a work assist system and a work assist device according to the third embodiment. FIG. 9 is a flowchart illustrating a procedure of processing performed by the work assist system and the work assist device according to the third embodiment.

A work assist system 3 and a work assist device 31 according to the third embodiment illustrated in FIG. 8 are different from the work assist system 1 and the work assist device 11 according to the first embodiment illustrated in FIG. 1 mainly in the following configurations described below. Regarding configurations not described below, configurations similar to the configurations adopted in the work assist system 1 and the work assist device 11 according to the first embodiment are also adopted in the work assist system 3 and the work assist device 31 according to the third embodiment.

As illustrated in FIG. 8, the work assist device 31 includes a production plan collection unit 112 and a production actual results collection unit 113.

Each of the production plan collection unit 112 and the production actual results collection unit 113 is connected to the simulation unit 107.

The production plan collection unit 112 collects production plans. The production plan collected by the production plan collection unit 112 is a production plan provided for the production line 121. The production plan collected by the production plan collection unit 112 is a daily production plan of the day when the collection is performed. The production plan collected by the production plan collection unit 112 is a production plan created in a production plan system or the like that is present outside of the work assist system 3 and the work assist device 31. If the production plan collected by the production plan collection unit 112 is the production plan created in the production plan system, when the production plan collection unit 112 collects the production plan, the production plan collection unit 112 is connected to the production plan system via a network, and the production plan system directly transmits the production plan to the production plan collection unit 112. A file in which the production plan is described may be output to a network folder or the like that can be accessed by both of the production plan system and the production plan collection unit 112, and the production plan collection unit 112 may read the file. The production plan system may output the production plan to a database, and the production plan collection unit 112 may read the output production plan.

The production actual results collection unit 113 collects production actual results. The production actual results collected by the production actual results collection unit 113 are production actual results achieved by the production line 121. The production actual results collected by the production actual results collection unit 113 are production actual results collected in a production management system or the like that is present outside of the work assist system 3 and the work assist device 31. The production actual results collection unit 113 may directly collect the production actual results from the production facility 132. If the production actual results collected by the production actual results collection unit 113 are the production actual results collected in the production management system, when the production actual results collection unit 113 collects the production actual results, the production actual results collection unit 113 is connected to the production management system via a network, and the production management system directly transmits the production actual results to the production actual results collection unit 113. A file in which the production actual results are described may be output to a network folder or the like that can be accessed by both of the production management system and the production actual results collection unit 113, and the production actual results collection unit 113 may read the file. The production management system may output the production actual results to a database, and the production actual results collection unit 113 may read the output production actual results.

The improvement measures storage 106 stores influence that the stored improvement measures exert on the production plan. For example, the following case is considered: similarly to the first embodiment, the improvement measures stored in the improvement measures storage 106 include "seating on a chair", "use of a step", "use of a jig", "illuminance change of the work table", and "orientation change of the product" being the improvement measures 161 whose target is the operator 131, "orientation change of the product at the time of conveyance" being the improvement measures 171 whose target is the first device 141, "height change" and "illuminance change" being the improvement measures 172 whose target is the work table 142, "speed change" being the improvement measures 173 whose target is the first conveyor line 144, "speed change" being the improvement measures 174 whose target is the second conveyor line 145, and "addition of a new operator, a new conveyor line, and a new work table" being the improvement measures whose target is the operator and the production facility. In this case, "use of a step", "orientation change of the product", "height change", and "speed change" increase working time, waiting time, or the like. Further, "illuminance change of the work table" and "orientation change of the product at the time of conveyance" do not increase working time, waiting time, or the like. Further, "addition of a new operator, a new conveyor line, and a new work table" reduces working time, waiting time, or the like. Thus, regarding "use of a step", "orientation change of the product", "height change", and "speed change", the improvement measures storage 106 stores a degree of reduction of production speed, an increase amount of working time, or the like. Further, regarding "illuminance change of the work table" and "orientation change of the product at the time of conveyance", the improvement measures storage 106 stores no reduction of production speed, no increase of working time, or the like. Further, regarding "addition of a new operator, a new conveyor line, and a new work table", the improvement measures storage 106 stores a degree of increase of production speed.

In simulation performed by the simulation unit 107, estimated influence that the improvement measures stored in the improvement measures storage 106 exert on the production plan is estimated.

The improvement measures determination unit 108 determines the application improvement measures, based on the estimated improvement effect and the estimated influence estimated by the simulation unit 107.

When the work assist system 3 and the work assist device 31 assist work, similarly to when the work assist system 1 and the work assist device 11 assist work, Steps S101 to S106 and S109 and S110 illustrated in FIG. 9 are executed. In addition, when the work assist system 3 and the work assist device 31 assist work, after it is determined in Step S106 that the work burden degree needs to be improved, Step S131 is executed, and after Step S131 is executed, Steps S107' and S108' are respectively executed instead of Steps S107 and S108.

In Step S131, the production plan collection unit 112 collects the production plan, and the production actual results collection unit 113 collects the production actual results. The production plan and the production actual results collected by the production plan collection unit 112 and the production actual results collection unit 113 are the production plan and the production actual results at the current time. The simulation unit 107 can obtain the production plan and the production actual results collected by the production plan collection unit 112 and the production actual results collection unit 113.

In subsequent Step S107', the simulation unit 107 performs simulation of estimating the estimated improvement effect indicating the degree of improvement of the work burden degree when the improvement measures stored in the improvement measures storage 106 are applied, and the estimated influence that the improvement measures exert on the production plan. Desirably, in the simulation, the estimated influence is estimated based on the production actual results. Further, the simulation unit 107 causes the improvement measures storage 106 to store the improvement measures, the estimated improvement effect, and the estimated influence.

In subsequent Step S108', the improvement measures determination unit 108 determines whether or not the improvement measures are to be applied, based on the estimated improvement effect and the estimated influence stored in the improvement measures storage 106. Further, the improvement measures determination unit 108 causes the improvement measures storage 106 to store information indicating whether or not the improvement measures are to be applied. For example, the following case is considered: the improvement measures stored in the improvement measures storage 106 include "use of a jig" and "speed change" described above, "use of a jig" has a relatively low estimated improvement effect and a relatively small reduction amount of production speed, and "speed change" has a relatively high estimated improvement effect and a relatively large reduction amount of production speed. In this case, the improvement measures determination unit 108 employs "speed change" having a relatively high estimated improvement effect and a relatively large reduction amount of production speed as the application improvement measures in a situation in which influence on the production plan is relatively easily permitted, such as a case in which a degree of deviation between a predicted value of the production actual results and the production plan is small. Further, the improvement measures determination unit 108 employs "use of a jig" having a relatively low estimated improvement effect and a relatively small reduction amount of production speed as the application improvement measures in a situation in which influence on the production plan is relatively difficult to be permitted, such as a case in which a predicted value of the production actual results has not reached a value of the production plan.

In subsequent Step S109, when there are application improvement measures, at least one of the operator delivery unit 109 and the production facility delivery unit 110 delivers information for applying the application improvement measures to at least one of the operator 131 and the production facility 132.

According to the invention of the third embodiment, similarly to the invention of the first embodiment, the application improvement measures for effectively reducing the burden imposed on the operator due to work can be automatically applied.

In addition, according to the invention of the third embodiment, estimated influence that the improvement measures exert on the production plan is estimated. Further, the application improvement measures are determined based on the estimated estimated influence. Thus, the application improvement measures can be automatically applied by taking the influence on the production plan into consideration. For example, the application improvement measures can be automatically applied such that a delay in the production actual results with respect to the production plan is minimized. Further, the application improvement measures can be automatically applied such that the work burden degree is greatly improved even though a delay in the production actual results with respect to the production plan is permitted. With these, the application improvement measures can be flexibly determined for the operator and the production plan.

5 First Modification of Third Embodiment

FIG. 2 is also a schematic diagram schematically illustrating an example of a production line in which work assisted by a work assist system and a work assist device is performed according to the first modification of the third embodiment. FIG. 4 is also a diagram illustrating an example of production facility information and timestamps stored in the work assist system and the work assist device according to the first modification of the third embodiment. FIG. 5 is also a diagram illustrating an example of improvement measures and estimated improvement effects stored in the work assist system and the work assist device according to the first modification of the third embodiment.

Figure 10:
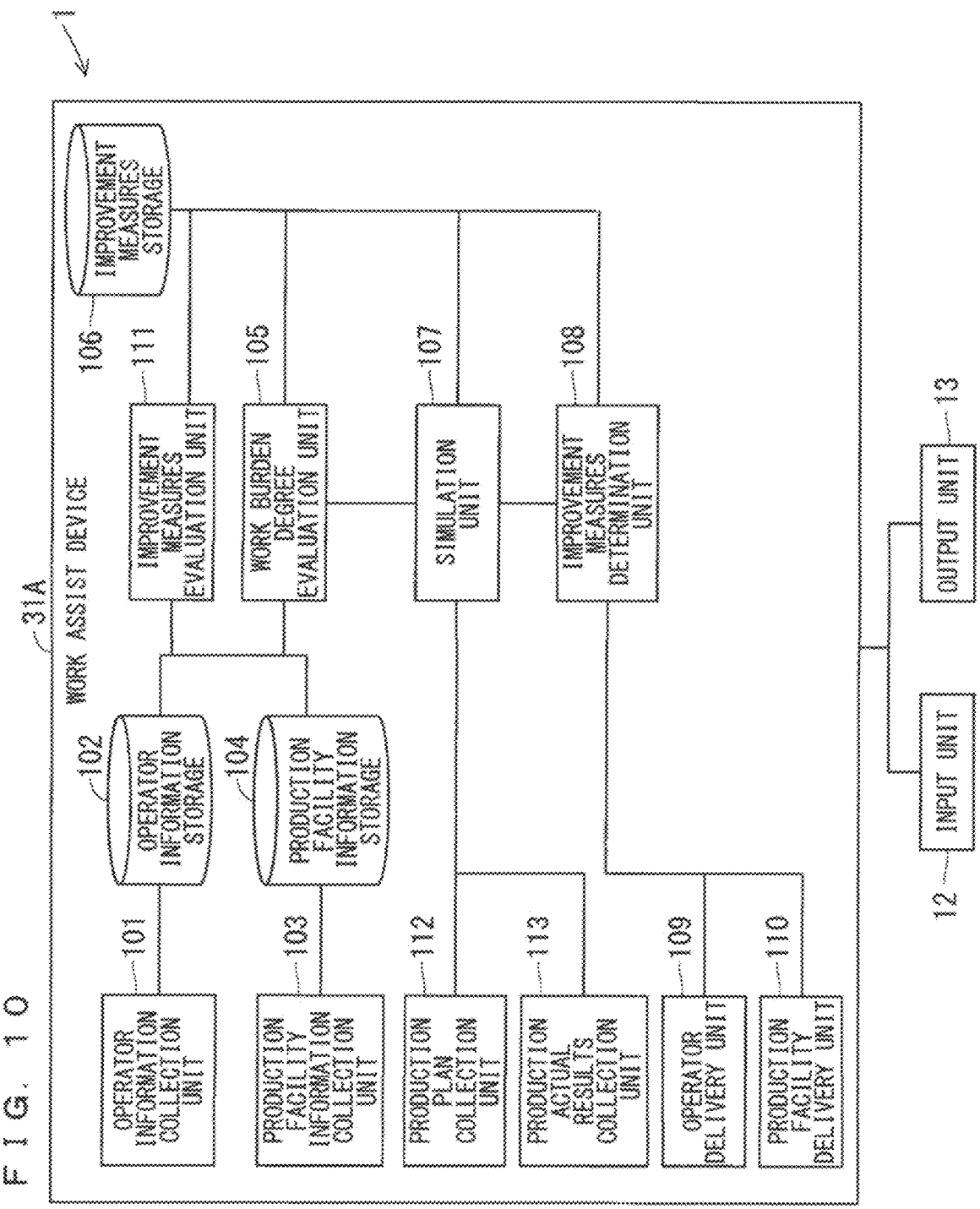
FIG. 10 is a block diagram illustrating a work assist system and a work assist device according to the first modification of the third embodiment.
Figure 11:
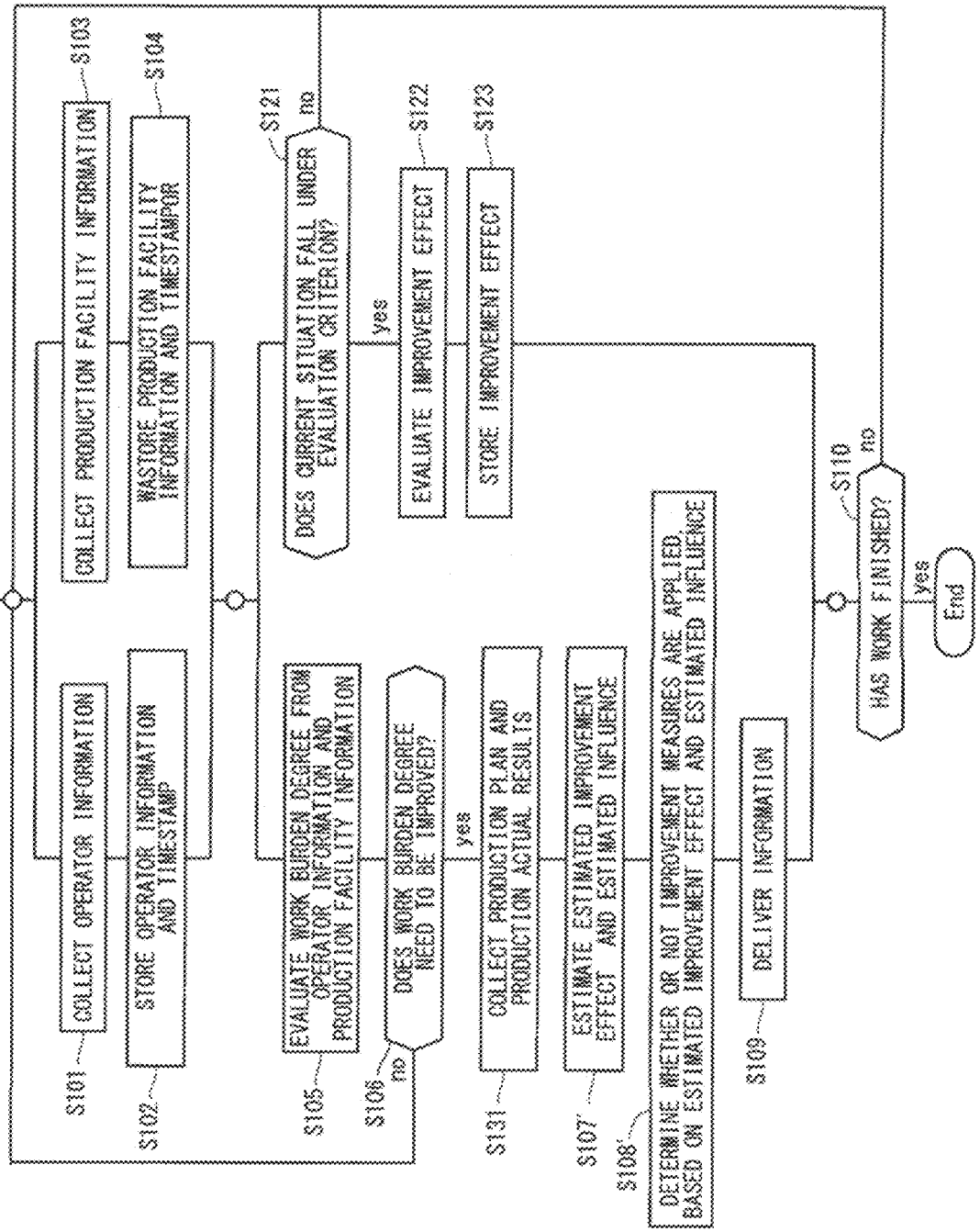
FIG. 11 is a flowchart illustrating a procedure of processing performed by the work assist system and the work assist device according to the first modification of the third embodiment.

FIG. 10 is a block diagram illustrating a work assist system and a work assist device according to the first modification of the third embodiment. FIG. 11 is a flowchart illustrating a procedure of processing performed by the work assist system and the work assist device according to the first modification of the third embodiment.

A work assist system 3A and a work assist device 31A according to the first modification of the third embodiment illustrated in FIG. 10 are different from the work assist system 2 and the work assist device 21 according to the second embodiment illustrated in FIG. 6 mainly in the following configurations described below. Regarding configurations not described below, configurations similar to the configurations adopted in the work assist system 2 and the work assist device 21 according to the second embodiment are also adopted in the work assist system 3A and the work assist device 31A according to the first modification of the third embodiment.

The difference between the work assist system 3A and the work assist device 31A according to the first modification of the third embodiment and the work assist system 2 and the work assist device 21 according to the second embodiment are similar to the difference between the work assist system 3 and the work assist device 31 according to the third embodiment and the work assist system 1 and the work assist device 11 according to the first embodiment.

When the work assist system 3A and the work assist device 31A assist work, similarly to when the work assist system 2 and the work assist device 21 assist work, Steps S101 to S106 and S109, S110, and S121 to S123 illustrated in FIG. 11 are executed. In addition, when the work assist system 3A and the work assist device 31A assist work, after it is determined in Step S106 that the work burden degree of the operator 131 needs to be improved, Step S131 is executed, and after Step S131 is executed, Step S107' and S108' are respectively executed instead of Steps S107 and S108.

In Step S122, the improvement measures evaluation unit 111 evaluates the improvement effect indicating the degree of improvement of the work burden degree when the application improvement measures are actually applied, and influence that the application improvement measures actually exert on the production plan.

In Step S123, the improvement measures evaluation unit 111 causes the improvement measures storage 106 to store the evaluated improvement effect and influence.

In Step S131, similarly to the third embodiment, the production plan collection unit 112 collects the production plan, and the production actual results collection unit 113 collects the production actual results.

In Step S107', similarly to the third embodiment, the simulation unit 107 performs simulation of estimating the estimated improvement effect indicating the degree of improvement of the work burden degree when the improvement measures stored in the improvement measures storage 106 are applied, and the estimated influence that the improvement measures exert on the production plan. Further, similarly to the third embodiment, the simulation unit 107 causes the improvement measures determination unit 108 to store the improvement measures, the estimated improvement effect, and the estimated influence.

In Step S108', similarly to the third embodiment, the improvement measures determination unit 108 determines whether or not the improvement measures are to be applied, based on the estimated improvement effect and the estimated influence stored in the improvement measures storage 106. Further, similarly to the third embodiment, the improvement measures determination unit 108 causes the improvement measures storage 106 to store information indicating whether or not the improvement measures are to be applied.

According to the invention of the first modification of the third embodiment, similarly to the invention of the first embodiment, the application improvement measures for effectively reducing the burden imposed on the operator due to work can be automatically applied.

Further, according to the invention of the first modification of the third embodiment, similarly to the invention of the second embodiment, the application improvement measures can be made more appropriate for the operator.

Further, according to the invention of the first modification of the third embodiment, similarly to the invention of the third embodiment, the application improvement measures can be automatically applied by taking the influence on the production plan into consideration.

In addition, according to the invention of the first modification of the third embodiment, the influence that the application improvement measures actually exert on the production plan is stored in the improvement measures storage 106. With this configuration, the influence stored in the improvement measures storage 106 can be self-learned, with the result that the estimated influence for the production plan can be estimated with high accuracy.

6 Fourth Embodiment

FIG. 2 is also a schematic diagram schematically illustrating an example of a production line in which work assisted by a work assist system and a work assist device is performed according to the fourth embodiment. FIG. 4 is also a diagram illustrating an example of production facility information and timestamps stored in the work assist system and the work assist device according to the fourth embodiment. FIG. 5 is also a diagram illustrating an example of improvement measures and estimated improvement effects stored in the work assist system and the work assist device according to the fourth embodiment.

Figure 12:
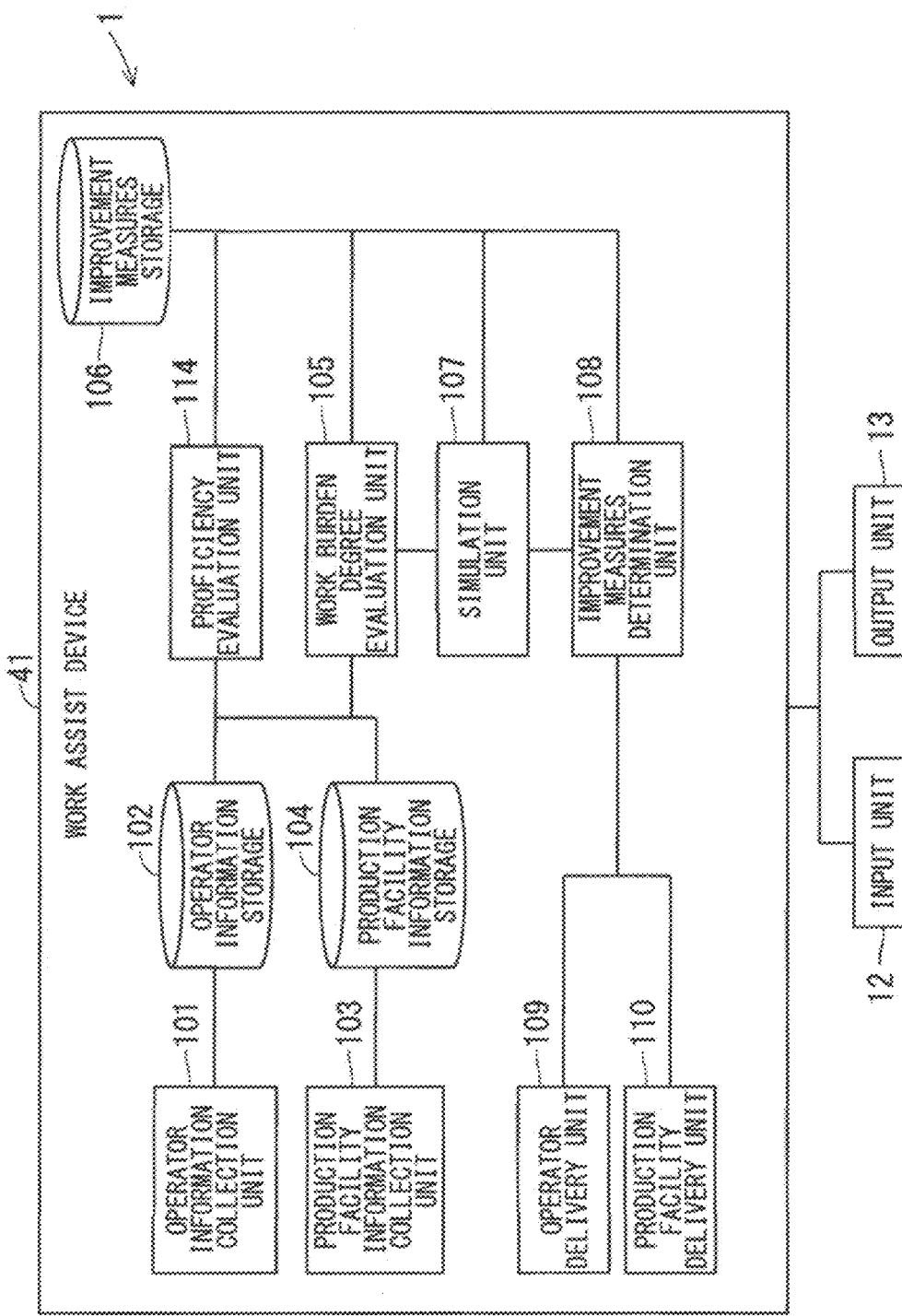
FIG. 12 is a block diagram illustrating a work assist system and a work assist device according to the fourth embodiment.
Figure 13:
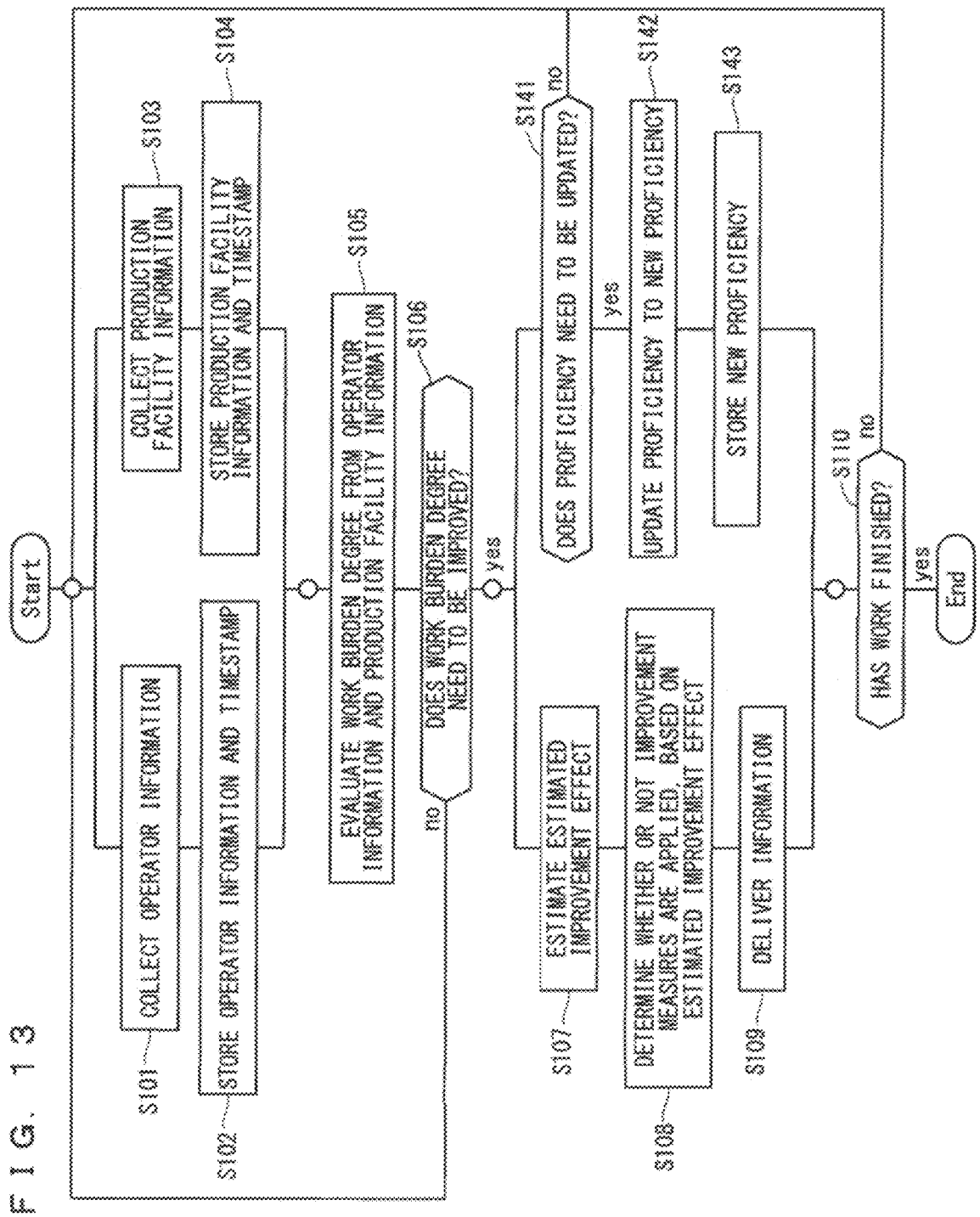
FIG. 13 is a flowchart illustrating a procedure of processing performed by the work assist system and the work assist device according to the fourth embodiment.

FIG. 12 is a block diagram illustrating a work assist system and a work assist device according to the fourth embodiment. FIG. 13 is a flowchart illustrating a procedure of processing performed by the work assist system and the work assist device according to the fourth embodiment.

A work assist system 4 and a work assist device 41 according to the fourth embodiment illustrated in FIG. 12 are different from the work assist system 1 and the work assist device 11 according to the first embodiment illustrated in FIG. 1 mainly in the following configurations described below. Regarding configurations not described below, configurations similar to the configurations adopted in the work assist system 1 and the work assist device 11 according to the first embodiment are also adopted in the work assist system 4 and the work assist device 41 according to the fourth embodiment.

The operator information stored in the operator information storage 102 includes proficiency indicating a degree of proficiency in work regarding the operator 131. The proficiency is used for correcting the work burden degree evaluated by the work burden degree evaluation unit 105.

The improvement measures storage 106 stores information specifying a corresponding work burden degree corresponding to the proficiency. The information stored in the improvement measures storage 106 may be an expected value, a minimum value, or a maximum value indicating the corresponding work burden degree, or may be a calculation expression for calculating the corresponding work burden degree.

As illustrated in FIG. 12, the work assist device 41 includes a proficiency evaluation unit 114.

The proficiency evaluation unit 114 is connected to the work burden degree evaluation unit 105.

When deviation between the work burden degree evaluated by the work burden degree evaluation unit 105 and the corresponding work burden degree corresponding to the proficiency included in the operator information stored in the operator information storage 102 is larger than a criterion, the proficiency evaluation unit 114 updates the proficiency. Generally speaking, if the operator 131 has high proficiency, the work burden degree tends to be low, and reduction in work efficiency, increase in fatigue, and the like tend not to be caused. In contrast, if the operator 131 does not have high proficiency, the work burden degree tends to be high, and reduction in work efficiency, increase in fatigue, and the like tend to be caused. Thus, according to the proficiency evaluation unit 114, proficiency being used as the basis for correction of the work burden degree evaluated by the work burden degree evaluation unit 105 can be updated to appropriate proficiency, and the work burden degree evaluated by the work burden degree evaluation unit 105 can be made close to the work burden degree that the operator 131 experiences.

When the work assist system 4 and the work assist device 41 assist work, similarly to when the work assist system 1 and the work assist device 11 assist work, Steps S101 to S110 illustrated in FIG. 13 are executed. In addition, when the work assist system 4 and the work assist device 41 assist work, after it is determined in Step S106 that the work burden degree needs to be improved, Steps S141 to S143 are executed in parallel to Steps S107 to S109.

In Step S141, whether or not the proficiency evaluation unit 114 needs to update the proficiency included in the operator information stored in the operator information storage 102 is determined. When deviation between the work burden degree evaluated by the work burden degree evaluation unit 105 and the corresponding work burden degree corresponding to the proficiency is larger than a criterion, it is determined that the proficiency needs to be updated. If it is determined that the proficiency needs to be updated, Steps S142 and S143 are sequentially executed, and then Step S110 is executed. If it is determined that the proficiency need not be updated, Steps S101 and S103 are executed again without Steps S142 and S143 being executed.

In Step S142, the proficiency evaluation unit 114 updates the proficiency included in the operator information stored in the operator information storage 102 to new proficiency. The new proficiency is obtained by, for example, determining based on searching for proficiency adapted for the work burden degree, whether working speed and/or work efficiency is high or low, whether the number of times of interruption during work is large or small, or the like.

In subsequent Step S143, the proficiency evaluation unit 114 causes the operator information storage 102 to store the new proficiency.

According to the invention of the fourth embodiment, similarly to the invention of the first embodiment, the application improvement measures for effectively reducing the burden imposed on the operator due to work can be automatically applied.

In addition, according to the invention of the fourth embodiment, the change of the proficiency which affects work ability of the operator can be automatically learned, and the work burden degree can be evaluated with high accuracy.

The configuration adopted in the work assist system 4 and the work assist device 41 according to the fourth embodiment may be adopted in the work assist system 1 and the work assist device 11 according to the first embodiment, the work assist system 2 and the work assist device 21 according to the second embodiment, the work assist system 3 and the work assist device 31 according to the third embodiment, or the work assist system 3A and the work assist device 31A according to the first modification of the third embodiment.

7 Fifth Embodiment

FIG. 2 is also a schematic diagram schematically illustrating an example of a production line in which work assisted by a work assist system and a work assist device is performed according to the fifth embodiment. FIG. 4 is also a diagram illustrating an example of production facility information and timestamps stored in the work assist system and the work assist device according to the fifth embodiment. FIG. 5 is also a diagram illustrating an example of improvement measures and estimated improvement effects stored in the work assist system and the work assist device according to the fifth embodiment.

Figure 14:
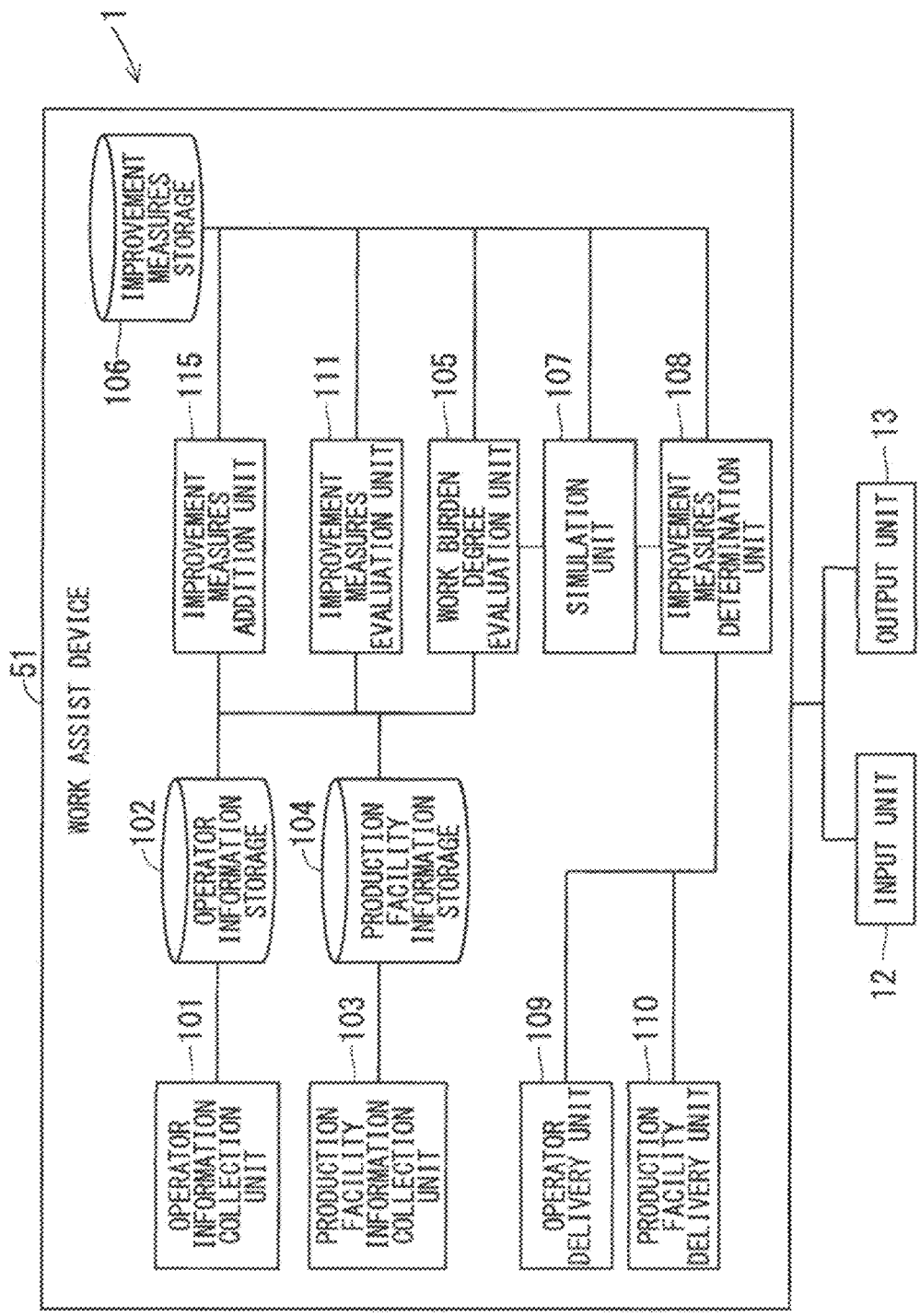
FIG. 14 is a block diagram illustrating a work assist system and a work assist device according to the fifth embodiment.

FIG. 14 is a block diagram illustrating a work assist system and a work assist device according to the fifth embodiment. FIG. 15 is a flowchart illustrating a procedure of processing performed by the work assist system and the work assist device according to the fifth embodiment.

A work assist system 5 and a work assist device 51 according to the fifth embodiment illustrated in FIG. 14 are different from the work assist system 2 and the work assist device 21 according to the second embodiment illustrated in FIG. 6 mainly in the following configurations described below. Regarding configurations not described below, configurations similar to the configurations adopted in the work assist system 2 and the work assist device 21 according to the second embodiment are also adopted in the work assist system 5 and the work assist device 51 according to the fifth embodiment.

As illustrated in FIG. 14, the work assist device 51 includes an improvement measures addition unit 115.

The improvement measures addition unit 115 creates improvement measures customized regarding the operator 131, based on an action of the operator 131. The improvement measures customized regarding the operator 131 are created by customizing existing improvement measures already stored in the improvement measures storage 106. Further, the improvement measures addition unit 115 adds the created improvement measures customized regarding the operator 131 to the improvement measures stored in the improvement measures storage 106. The improvement measures addition unit 115 may add new improvement measures to the improvement measures stored in the improvement measures storage 106, based on an action of the operator 131. The action of the operator 131 that triggers addition of the improvement measures customized regarding the operator 131 or the new improvement measures is an action of stopping application of the application improvement measures, an action of manually changing a set value of the production facility 132, or the like. The details of the action are stored together with the personal identifier of the operator 131 when the improvement measures customized regarding the operator 131 or the new improvement measures are added. Generally speaking, the operator 131 having high proficiency in many cases has their original work procedures, work know-how, and the like, and performs the above-described actions in order to utilize the original work procedures, the work know-how, and the like. Thus, according to the improvement measures addition unit 115, the improvement measures customized regarding the operator 131 having high proficiency can be automatically applied, and the original work procedures, the work know-how, and the like of the operator 131 having high proficiency can be reflected on beginners or average operators.

The operator information stored in the operator information storage 102 includes proficiency indicating how the operator 131 is proficient in work.

The improvement measures storage 106 provides, for the improvement measures customized regarding the operator 131, a flag indicating that the improvement measures are the improvement measures customized regarding the operator 131, and the personal identifier of the operator 131. Further, the improvement measures storage 106 stores the provided personal identifier of the operator 131.

When the improvement measures stored in the improvement measures storage 106 include the improvement measures customized regarding the operator 131, the improvement measures determination unit 108 preferentially incorporates the improvement measures customized regarding the operator 131 in the application improvement measures even when there are improvement measures having the estimated improvement effect higher than the estimated improvement effect of the improvement measures customized regarding the operator 131.

When the work assist system 5 and the work assist device 51 assist work, similarly to when the work assist system 2 and the work assist device 21 assist work, Steps S101 to S110 and S121 and S122 illustrated in FIG. 15 are executed. In addition, when the work assist system 5 and the work assist device 51 assist work, after Step S122 is executed, Steps S151 to S153 are executed.

In Step S151, whether or not the set value collected by the production facility information collection unit 103 and the set value delivered by the production facility delivery unit 110 match each other is determined. If it is determined that the set values match each other, Steps S152 and S153 are sequentially executed, and then Step S110 is executed. If it is determined that the set values do not match each other, Steps S101 and S103 are executed again without S152 and S153 being executed.

In Step S152, the improvement measures addition unit 115 determines the reason why the set value has been changed from the operator information and the production facility information.

In subsequent Step S153, if the reason why the set value has been changed is because of the action of the operator 131 described above, the improvement measures addition unit 115 causes the improvement measures storage 106 to store the changed set value of the production facility 132 and the personal identifier of the operator 131 constituting the improvement measures customized regarding the operator 131.

In Step S108, when the improvement measures stored in the improvement measures storage 106 include the improvement measures customized regarding the operator 131, the improvement measures customized regarding the operator 131 are preferentially incorporated in the application improvement measures even when there are improvement measures having the estimated improvement effect higher than the estimated improvement effect of the improvement measures customized regarding the operator 131. When the improvement measures stored in the improvement measures storage 106 include improvement measures customized regarding another operator, and the improvement measures customized regarding another operator include a high estimated improvement effect, the improvement measures customized regarding another operator may be incorporated in the application improvement measures.

When it is estimated in Step S107 that the improvement measures customized regarding the operator 131 have a high estimated improvement effect regarding a plurality of operators, the improvement measures customized regarding the operator 131 may be added to the improvement measures stored in the improvement measures storage 106 as the improvement measures that can be applied to all of the operators.

According to the invention of the fifth embodiment, similarly to the invention of the first embodiment, the application improvement measures for effectively reducing burden imposed on the operator 131 due to work can be automatically applied.

Further, according to the invention of the fifth embodiment, similarly to the invention of the second embodiment, the application improvement measures can be made more appropriate for the operator.

In addition, according to the invention of the fifth embodiment, the improvement measures customized regarding the operator having high proficiency can be automatically applied. Thus, work procedures, work know-how, and the like of the operator having high proficiency can be reflected on beginner and average operators.

The configuration adopted in the work assist system 5 and the work assist device 51 according to the fifth embodiment may be adopted in the work assist system 3A and the work assist device 31A according to the first modification of the third embodiment. The configuration adopted in the work assist system 5 and the work assist device 51 according to the fifth embodiment may be adopted in the work assist system and the work assist device modified to include the improvement measures evaluation unit 111.

Note that, in the present invention, each embodiment can be freely combined, and each embodiment can be modified or omitted as appropriate within the scope of the invention.

While the invention has been shown and described in detail, the foregoing description is in all aspects illustrative and not restrictive. It is therefore understood that numerous unillustrated modifications can be devised without departing from the scope of the present invention.

The invention claimed is:
1. A work assist device comprising:
work burden degree evaluation circuitry to evaluate a work burden degree indicating a degree of burden imposed on an operator due to work from operator information related to the operator performing the work in cooperation with a production facility and production facility information related to the production facility, the production facility including at least one production device used by the operator when performing the work;
an improvement measures memory to store improvement measures for improving the work burden degree;
simulation circuitry to perform simulation of estimating an estimated improvement effect indicating a degree of improvement of the work burden degree when the improvement measures are applied;
improvement measures determination circuitry to determine application improvement measures to be applied to at least one of the operator and the production facility from the improvement measures, based on the estimated improvement effect;
an operator information memory to store the operator information;
an operator information receiver to collect new operator information to be included in the operator information successively in real time;
a production facility information memory to store the production facility information;
a production facility information receiver to collect new production facility information to be incorporated in the production facility information successively in real time; and
a controller that controls a setting of the at least one production device to automatically implement the determined application improvement measures.

2. The work assist device according to claim 1, wherein the work burden degree evaluation circuitry evaluates the work burden degree in real time from the new operator information and the new production facility information when the new operator information and the new production facility information are collected.

3. The work assist device according to claim 1, wherein the controller circuitry is configured to control the setting of the at least one production device to automatically implement the determined application improvement measures in real time when the application improvement measures to be applied are determined.

4. The work assist device according to claim 1, wherein the at least one production device includes at least one of a height adjustable work table, a robot device, a processing device to which the operator supplies a component, a mechanism that supports and/or lifts a work target object or the component, a conveyor line that conveys the component or the work target object, a lighting device, an air-conditioning device, and an air-sending device.

5. The work assist device according to claim 1, further comprising:
operator delivery circuitry that informs the operator of the determined application improvement measures.

6. The work assist device according to claim 5, wherein the operator delivery circuitry includes at least one of a mobile terminal of the operator, signage at the production facility, or a monitor at the production facility, and the operator information interface informs the operator of the determined application improvement measures by visual, voice, or other signal information.

7. The work assist device according to claim 6, wherein the operator delivery circuitry is configured to inform the operator of the determined application improvement measures in real time when the application improvement measures to be applied are determined.

8. The work assist device according to claim 1, wherein the improvement measures include the improvement measures with introduction of a new facility and the improvement measures without the introduction of the new facility.

9. A work assist device comprising:
work burden degree evaluation circuitry to evaluate a work burden degree indicating a degree of burden imposed on an operator due to work from operator information related to the operator performing the work in cooperation with a production facility and production facility information related to the production facility, the production facility including at least one production device used by the operator when performing the work;
an improvement measures memory to store improvement measures for improving the work burden degree;
simulation circuitry to perform simulation of estimating an estimated improvement effect indicating a degree of improvement of the work burden degree when the improvement measures are applied;
improvement measures determination circuitry to determine application improvement measures to be applied to at least one of the operator and the production facility from the improvement measures, based on the estimated improvement effect; and
a controller that controls a setting of the at least one production device to automatically implement the determined application improvement measures, wherein
the improvement measures include the improvement measures with introduction of a new facility and the improvement measures without the introduction of the new facility,
in the simulation, the estimated improvement effect indicating the degree of improvement of the work burden degree when the improvement measures with the introduction of the new facility are applied, and the estimated improvement effect indicating the degree of improvement of the work burden degree when the improvement measures without the introduction of the new facility are applied are estimated, and
when the improvement measures with the introduction of the new facility have a best estimated improvement effect, the improvement measures determination circuitry incorporates, in the application improvement measures, the improvement measures with the introduction of the new facility and the improvement measures without the introduction of the new facility.

10. The work assist device according to claim 9, further comprising:
an operator information memory to store the operator information;
an operator information receiver to collect new operator information to be included in the operator information successively in real time;
a production facility information memory to store the production facility information; and
a production facility information receiver to collect new production facility information to be incorporated in the production facility information successively in real time.

11. The work assist device according to claim 9, wherein in the simulation, estimated influence that the improvement measures exert on a production plan is further estimated, and
the improvement measures determination circuitry determines the application improvement measures, based on the estimated improvement effect and the estimated influence.

12. The work assist device according to claim 9, further comprising
improvement measures addition circuitry to create the improvement measures customized regarding the operator, based on an action of the operator, and add the improvement measures customized regarding the operator to the improvement measures.

13. The work assist device according to claim 9, further comprising:
operator delivery circuitry that informs the operator of the determined application improvement measures.

14. A work assist device comprising:
work burden degree evaluation circuitry to evaluate a work burden degree indicating a degree of burden imposed on an operator due to work from operator information related to the operator performing the work in cooperation with a production facility and production facility information related to the production facility, the production facility including at least one production device used by the operator when performing the work;
an improvement measures memory to store improvement measures for improving the work burden degree;
simulation circuitry to perform simulation of estimating an estimated improvement effect indicating a degree of improvement of the work burden degree when the improvement measures are applied; and improvement measures determination circuitry to determine application improvement measures to be applied to at least one of the operator and the production facility from the improvement measures, based on the estimated improvement effect; and controller circuitry that controls a setting of the at least one production device to automatically implement the determined application improvement measures, wherein the application improvement measures include the application improvement measures to be applied to the production facility.

15. The work assist device according to claim 14, wherein the controller circuitry controls the setting of the at least one production device to automatically implement the determined application improvement measures in real time when the application improvement measures to be applied to the production facility are determined.

16. The work assist device according to claim 14, wherein the improvement measures include the improvement measures with introduction of a new facility and the improvement measures without the introduction of the new facility.

17. The work assist device according to claim 14, further comprising:

operator delivery circuitry that informs the operator of the determined application improvement measures.

18. The work assist device according to claim 17, wherein the operator delivery circuitry is configured to inform the operator of the determined application improvement measures in real time when the application improvement measures to be applied to the production facility are applied to the production facility.

* * * * *